US008070333B2

(12) United States Patent
von Wolske

(10) Patent No.: US 8,070,333 B2
(45) Date of Patent: Dec. 6, 2011

(54) DOCKING LIGHT SYSTEM INCLUDING AN ACCESSORY LAMP

(75) Inventor: James P. von Wolske, Austin, TX (US)

(73) Assignee: James P. von Wolske, Austin, TX (US)

( * ) Notice: Subject to any disclaimer, the term of this patent is extended or adjusted under 35 U.S.C. 154(b) by 2131 days.

(21) Appl. No.: 10/663,899

(22) Filed: Sep. 16, 2003

(65) Prior Publication Data

US 2004/0062050 A1 Apr. 1, 2004

Related U.S. Application Data

(62) Division of application No. 09/982,322, filed on Oct. 18, 2001, now Pat. No. 6,637,915.

(51) Int. Cl.
*B60Q 1/00* (2006.01)

(52) U.S. Cl. ........................................ 362/477; 362/511

(58) Field of Classification Search .................. 362/477, 362/511, 520, 521, 540, 551; 340/984, 985
See application file for complete search history.

(56) References Cited

U.S. PATENT DOCUMENTS

| | | | |
|---|---|---|---|
| 434,280 A | 8/1890 | Koyl et al. | |
| 1,133,536 A | 3/1915 | Chase | |
| 2,504,866 A | 4/1950 | Morse | |
| 2,593,171 A | 4/1952 | Morse | |
| 2,619,582 A | 11/1952 | Morse | |
| 2,740,038 A | 3/1956 | Carrie | |
| 2,850,621 A | 9/1958 | Bateman et al. | |
| 2,907,295 A | 10/1959 | Delaney | |
| 3,192,376 A | 6/1965 | Najimian, Jr. | |
| 3,221,162 A | 11/1965 | Heenan et al. | |
| 3,431,408 A | 3/1969 | Roosevelt | |
| 4,191,991 A | 3/1980 | Sorlien | |
| 4,245,281 A | 1/1981 | Ziaylek, Jr. | |
| 4,360,859 A | 11/1982 | Ziaylek, Jr. | |
| 4,367,519 A | 1/1983 | Houghton et al. | |
| 4,441,783 A | 4/1984 | Houghton et al. | |
| 4,445,163 A | 4/1984 | Ziaylek, Jr. | |
| 4,856,452 A | 8/1989 | Pingel et al. | |
| 5,285,359 A | 2/1994 | Czipri | |
| 5,339,225 A | 8/1994 | Wiggerman | |
| 5,408,221 A | 4/1995 | Carsella et al. | |
| 5,416,670 A | 5/1995 | Authier | |
| 5,636,916 A | 6/1997 | Sokolowski | |
| 5,672,004 A * | 9/1997 | Schmidt, Jr. | 362/421 |
| 5,688,036 A | 11/1997 | Marshall et al. | |
| 5,882,109 A | 3/1999 | McKinney et al. | |
| 6,155,195 A | 12/2000 | Nirenberg | |
| 6,176,601 B1 | 1/2001 | Nester | |
| 6,371,634 B1 | 4/2002 | Tufte | |
| 6,672,240 B1 * | 1/2004 | Aube et al. | 114/343 |

FOREIGN PATENT DOCUMENTS

| | | |
|---|---|---|
| GB | 2119072 | 11/1983 |

* cited by examiner

*Primary Examiner* — Hargobind Sawhney
(74) *Attorney, Agent, or Firm* — Gary R. Stanford

(57) ABSTRACT

A docking light system for a watercraft including a docking light fixture, a docking lamp positioned within the docking light fixture, and an accessory lamp mounted to the docking light fixture. The accessory lamp emits light outwardly from the watercraft and is masked to control the horizontal and vertical beam spread sectors of emitted light from illuminating the watercraft causing glare to an occupant of the watercraft. In another aspect, a navigation light is provided on the docking light fixture, where the navigation light may be a masthead light, a stern light, a port side marker light, a starboard side marker light, etc.

13 Claims, 20 Drawing Sheets

DOCKING LIGHT SYSTEM INCLUDING AN ACCESSORY LAMP

CROSS-REFERENCE TO RELATED APPLICATION(S)

The present application is a Divisional application of U.S. patent application entitled "Navigation Light System and Method", Ser. No. 09/982,322, filed Oct. 18, 2001 now U.S. Pat. No, 6,637,915, which is hereby incorporated by reference in its entirety.

FIELD OF THE INVENTION

The present invention is directed towards a docking light system for watercraft, and more particularly, towards a docking light system that includes an accessory lamp that may be operated as a navigation light, such as a masthead light, a stern light, a port side marker light, a starboard marker light, etc., which is positioned to reduce glare as perceived by an occupant of the watercraft.

BACKGROUND OF THE INVENTION

In the endeavor of night time boating, safe operation requires two things. First, night time boating requires that the operator be able to "see" into the darkness of night, which is defined in navigation literature as to "maintain proper lookout". The lookout requirement is best attained if the boat were operated without lights. Second, night time boating requires that the boat "be seen" by others in the darkness of night. This second requirement is defined in navigation literature as "conspicuity". Conspicuity is best attained if the boat were lit brightly with numerous lights. The criteria for safety, therefore, is to "see" and "be seen". Historically, however, these two goals have been at cross purposes. The problem is glare, otherwise referred to as unwanted light. There are five types glare, including primary glare, secondary glare, reflected glare, water glare, and bloom.

Primary glare is that light which emanates from a bulb or from a lensed or focused light source that travels directly to the observer's eye. Primary glare is the type of light observed by looking directly into the focused beam of a flashlight or at a bare bulb. With primary glare, the observer sees the full force of the illumination.

An example of secondary glare is light which is observed by looking at a flashlight from the front, but off to the side. With secondary glare, the observer sees the lens as a secondary source of emission, but does not see the full brightness of the beam or the bare bulb.

Reflected glare is the type of light which bounces back to the observer from an illuminated surface. With reflected glare, the observer sees different objects with different clarity depending upon the reflectivity, shape, color, distance, and orientation of the object. Reflected glare in the context of this invention is that which is coming from the hull of a boat, or its fittings, or people in the boat. Water glare is a type of reflected glare that is usually not a problem unless the water is white-capping or the bow wake or stern wake is illuminated.

Bloom is a type of reflected glare that is readily observed when a bright beam pierces a hazy night. The haze that is in the beam is actually reflected light from small particles of dust or water in the light path. With bloom, the observer experiences different degrees of glare depending upon the clarity of the air and upon the lateral standoff distance of the observer relative to the beam. It is well known that on hazy nights, it is better to step off to the side of a spotlight so that the beam is at a distance away from the observer's line of sight so as to minimize the adverse effects of bloom. Bloom is a problem, even on clear nights with relatively dim lights, if it impairs the driver's night vision. Bloom can be considered as air glare. Secondary glare can become reflected glare, water glare, or bloom. Even reflected glare can become another reflected glare, water glare, or bloom.

It is appreciated that glare is undesirable as it impairs the operator's ability to see out into the darkness as part of his duty to maintain proper lookout. On the other hand, navigation lights are required for conspicuity and to avoid collision.

Current Navigation Rules that attempt to address night time boating conditions are antiquated. These lighting rules were promulgated before high speed watercraft were available and when night boating was rare. These rules call for red, green, and white lights to be appropriately displayed. It is the white light, by virtue of its intensity and location, which causes the most problems associated with glare. Current regulations require that the white masthead light be positioned at least one meter above the red and green lights when the craft is in it's "normal at rest" floating position. In addition, the vertical sector requirements are defined as the vertical angle subtended by the light emitted from the fixture. It is measured from the "at rest" and "unloaded" condition of the craft relative to the horizon. When a planing craft is "under way" and passengers are in the craft, the vertical sector requirements are meaningless as the craft has assumed a new attitude and the navigation lights often shine above or below the intended horizontal plane. This results in an unsafe condition.

Separate lens covers over lights have been required ever since oil lanterns were used at sea, to both shield the flame, and to give appropriate color to the marker lights. Separate lens covers exacerbate the fugitive glare problem due to their secondary emission. The secondary emission only gets worse with time as the lens gets dirty or hazy. Lenses also tend to smear the intended sharp cutoff lines as required on the vertical and horizontal sector angles.

Forward looking white navigation lights with a 225 degree horizontal spread are referred to as masthead lights. Stern lights are white and currently require 135 degrees of horizontal coverage to the rear of the boat. On boats under 12 meters in length, it is permissible to combine the masthead light and the stern light into a single 360 degree "all around" light. It also has glare problems. Red and green side lights are required to shine from dead ahead to 112.5 degrees to the rear on either side of the boat. Although these fixtures are available in red and green, they are not available in white.

Existing solutions specifically mount the all around light on a pole or mast, making it vulnerable to snagging on lines, ski tow ropes, and overhanging structures. This type of elevated mast mounting usually necessitates a telescopic or removable mast to protect the fixture from harm during daytime use. An application problem is that all fixtures are manufactured and certified to be mounted on a flat horizontal surface or on a flat vertical surface parallel to the fore to aft centerline of the craft. Boats rarely have a flat, truly horizontal surface or a truly vertical surface. Even boats that have a surface approximating those contours, those surfaces are usually not at the proper location on the boat to correctly display the lights.

Current regulations require that the fixture provide a horizontal fan of light correctly oriented relative to both the horizon and the fore to aft axis of the boat. The correct location for the lights is on the front half of the boat, and that surface is usually angled downward and inward due to the streamlined configuration of the hull. Prior art fixtures cannot perform as required, and are designed for vertical mounting only or horizontal mounting only and these locations are rarely found on modern boats. When a sloped surface on a hull also tapers inward, the correct mounting of prior art fixtures becomes impossible for the average user. Therefore, mounting a fixture designed for vertical or horizontal application on a surface which is neither vertical nor horizontal, totally defeats the intent of trying to maintain the strict light beam sector limits and results in an unsafe condition.

The vertical sector requirements are that the light shall be of full brightness from the horizon up and down for 5 degrees and taper off to not less than 60 percent brightness at plus or minus 7.5 degrees from the horizon. This is difficult to maintain on small craft even when the fixtures are mounted correctly.

Increasing the vertical sector requirements for better coverage causes the light to shine down into the craft and blind the driver, or to cast uselessly up into the night sky. Attempts to minimize the down cast light and resultant glare are addressed by the addition of a mask below the light. Other attempts have refined the vertical sector angles of emission significantly, but cause conspicuity problems if the light is installed at the incorrect angle relative to the hull, and can be exacerbated when the craft is under way.

Section 16 of the American Boat and Yacht Council (ABYC) acknowledges the glare problem and requires that the lights be located in a position to eliminate all direct or indirect glare from the light which could reach the operators eyes. It is not possible, however, to maintain the desired horizontal and vertical light pattern using current technology due, in part, to the secondary glare from the lens cover and the housing on the fixture. Secondary glare reflects off objects in the craft and adversely affects the driver's night vision.

BRIEF DESCRIPTION OF THE DRAWINGS

The accompanying drawings, which are incorporated in and form a part of the specification, illustrate the embodiments of the present invention, and, together with the description serve to explain the principles of the invention. It is to be noted that the drawings illustrate only typical embodiments of the invention and are, therefore, not to be considered limiting of its scope, for the invention will admit to other equally effective embodiments. In the drawings.

DETAILED DESCRIPTION OF EMBODIMENT(S) OF THE INVENTION

Figure 1:
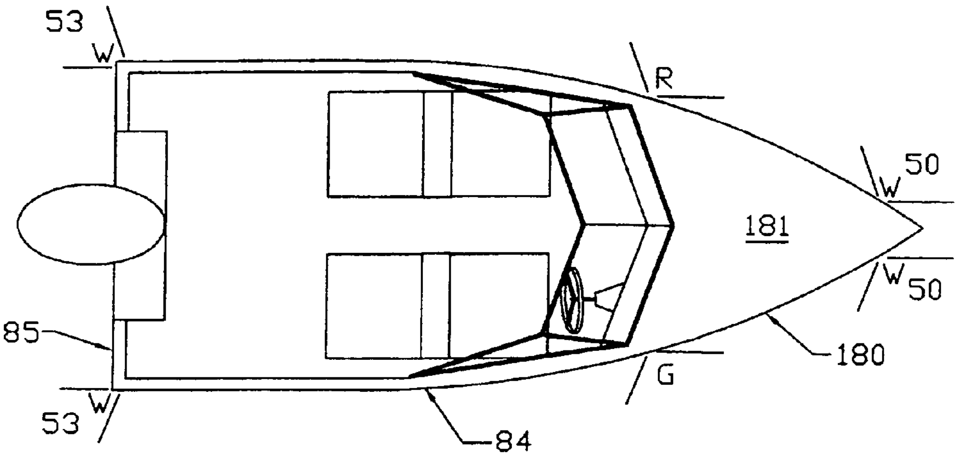
FIG. 1 is an overhead view of an exemplary boat showing several exemplary locations of the navigation lights in accordance with embodiments of the present invention to minimize glare.
Figure 2:
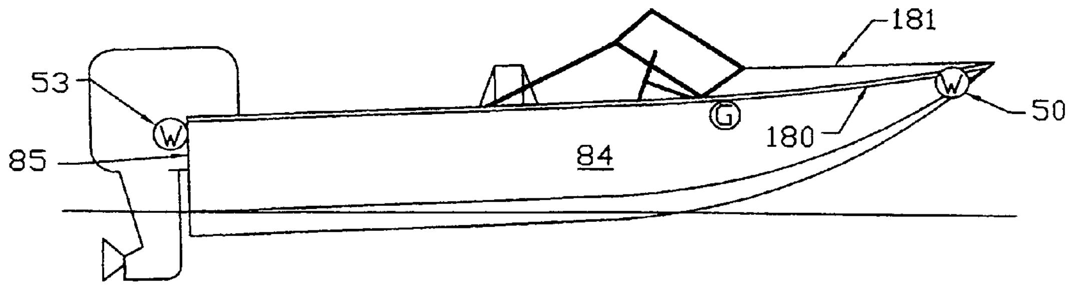
FIG. 2 is a horizontal side view of the boat of FIG. 1 illustrating the positions of the navigation lights to facilitate the masking effect by the hull.
Figure 3:
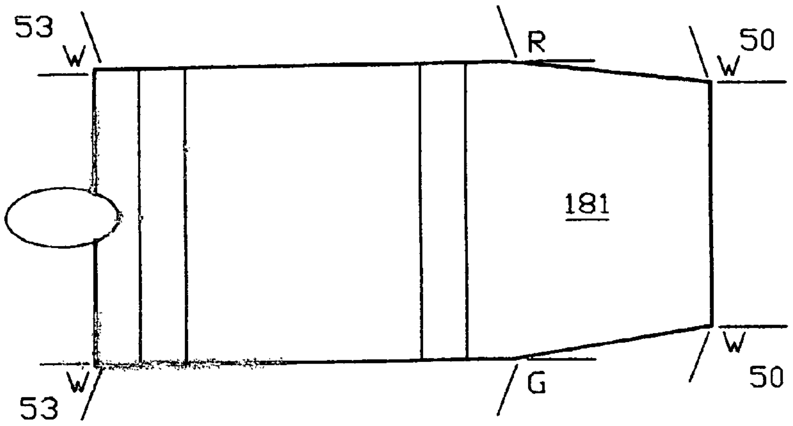
FIG. 3 is an overhead view of an exemplary jon boat illustrating exemplary locations of the navigation lights at the corners to minimize glare.
Figure 4:
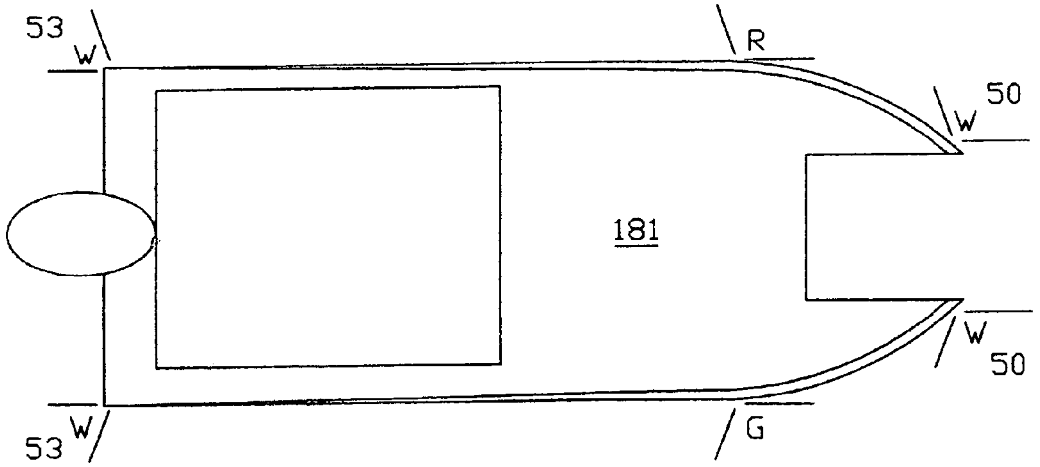
FIG. 4 is an overhead view of an exemplary catamaran boat illustrating exemplary light locations to reduce glare.
Figure 5:
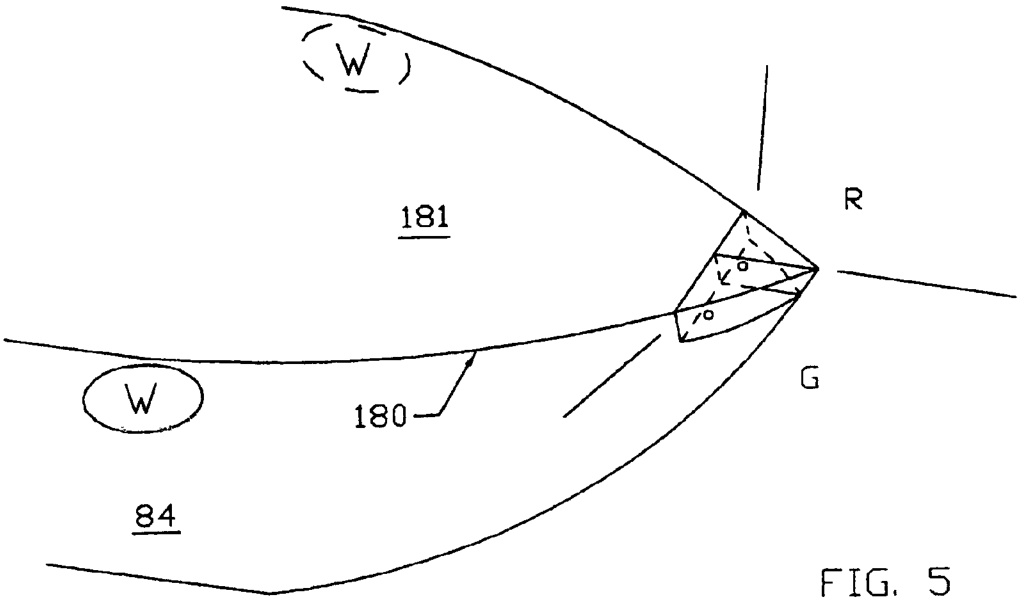
FIG. 5 is a perspective view of the front end of a boat illustrating an exemplary location of the white lights to minimize glare.
Figure 6:
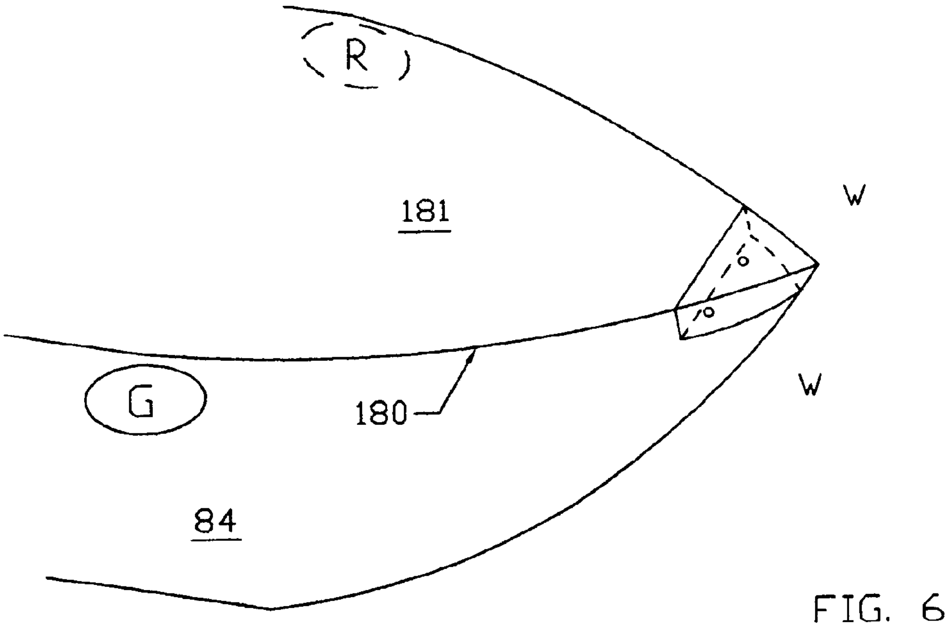
FIG. 6 is a perspective view of the front end of a boat illustrating exemplary locations and types of white light which features two lamps in one fixture, providing redundant lighting and a solution for potential structural stiffness of the fixture.
Figure 7:
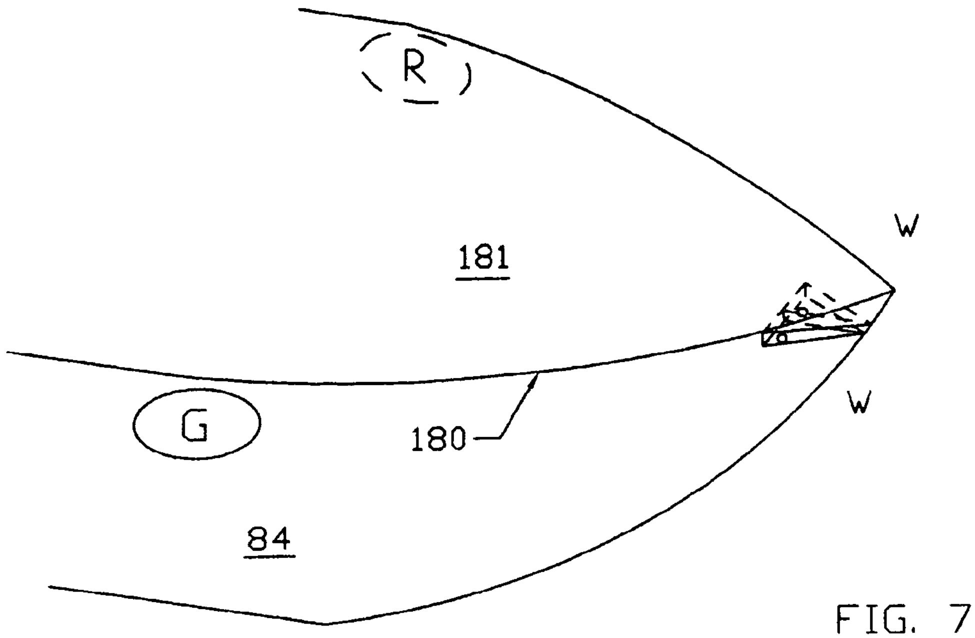
FIG. 7 is a perspective view of the front end of a boat illustrating an exemplary two lamp fixture cut into the centerline of the bow and below the shear line.

It is noted that the term "navigation light" generally refers to certain lights used for navigation purposes, such as a "masthead light" or a "stern light" among other types of navigation lights. It is noted, however, that the terms "masthead" and "stern" are typically used to refer to specific navigation lights that conform to all of the strict requirements specified in the Navigation Rules. The masthead lights and stern lights described herein, however, do not necessarily conform to the strict requirements of the Navigation Rules although they may be used to perform masthead or stern light functions. Thus, these lights may be considered "accessory lights" that may perform masthead or stern light functions as defined in the current Navigation Rules. It is contemplated that the accessory lights described herein are improvements of the existing navigation lights and may in fact conform to masthead or stern lights of new Navigation Rules if the Rules are modified to take advantage of the improvements described herein.

The present invention contemplates the location of the masthead light at or near the perimeter of the boat. The present invention also contemplates mounting the lights at, above, or below the shear line of the boat, which is usually the outermost surface of the craft and where the rub rail is located. This is achieved using one or two fixtures. In one embodiment, a light fixture is located on the hull of a watercraft so that the hull acts as a part of the shading device to minimize glare. By moving the lights to a novel location on the vessel, glare can be reduced dramatically while at the same time allowing brighter and more visible lights. In particular, the craft acts as a light shield to minimize the back scatter of light in a direction not intended to be illuminated. In this manner, the light is "on the other side of the hill" relative to the driver and there is no direct or reflected path for the light to cause glare in the drivers eyes. The glare caused by a navigation light is substantially reduced by locating the light at or near the perimeter of the craft. This enables the use of brighter lights and with greater sector angles. This facilitates the permanent mounting of the lights in a more robust, harm free location than current state of the art lights and eliminates the need or desirability of removing the light mast during non-use times. This also allows the lights to be permanent and secure without requiring removal or reinstallation on a regular basis.

Another aspect of the invention contemplates the white navigation light(s) as a flush mount into the hull, or a surface mount on the hull or on a railing. This location is at the bow of the craft or at the front quarter of the craft to provide both the straight on and side visibility horizontal sector viewing requirements. In this configuration, the white light, or lights, serves as the "masthead light". A single bow mounted white light may be more economical, yet the required mounting hole may compromise the structural integrity of the hull where it is most important. Dual white lights at the front of the boat on either side of the centerline may be less subject to impact damage. Another advantage of using a pair of lights rather than one light is that a redundant light bulb is always in play with the same advantages as having two headlights as on an automobile or motorcycle.

Another aspect is the separation of the stern lights into two lights. A benefit of using two lamps in one fixture, or two separate, but closely spaced, fixtures, is that there is a degree of redundancy such that if one lamp fails, the other still provides some warning functionality. Even if the two lamps are close together, they appear as one to a distant observer. In some applications, a spacer or some form of septum is provided to maintain structural integrity. A single lamp would be obstructed from view over a partial arc of its intended horizontal sector, which is unacceptable. Therefore, a dual lamp fixture, due to its overlapping light rays, is used to restore the compromised full horizontal sector.

Another aspect of the invention contemplates the white stern light as a mounted pair on either side of an outboard motor near the stern corners of the craft. Stern lights were often mounted at a low level on the transom of inboard motor driven craft. Such single, non-masted stern lights are not practical on boats that have protruding outdrives or outboard motors because the light is obstructed from view on the opposite side of the craft by the protruding drive components. It is contemplated that a fixture formed integral to the hull molding or fabrication process is equivalent to a separate fixture serving as a navigation light. The present invention also contemplates dual white lights mounted on catamaran type craft, jon boats, or other rectangular shaped craft, where it is beneficial to have separation of the lights to minimize glare and maximize conspicuity.

Yet another aspect of the present invention is the use of an unlensed bulb in any of the embodiments described herein. It is contemplated that available light sources are sufficiently robust to withstand direct exposure to the weather elements and other hazards of operation, so that the problems associated with lenses are avoided. An unlensed lamp relies on lamp intensity, so that in many embodiments there is no need or advantage of a lens. The use of an unlensed light source mounted in a reflective cavity directs the light away from the hull. Also, the edge of the cavity acts as a delimiter on the horizontal and vertical spread of the light beam.

The lens, if used at all, may be placed outside the shield and does not need to be held in place by the shield. The present invention contemplates a type of fixture which optionally has a lens for protection of the light source, although this is not required.

The present invention also contemplates a type of fixture which optionally has a lens for coloration of the light. It is further contemplated that the red light and the green light, or other colors, where suitable, are attainable by coloration of the bulb or by the use of appropriately colored LED or other suitable light source, including white LED or other sources, so that a separate lens is not necessary. It is also contemplated that new light sources, such as fluorescent, cold chemical, fiber optics, or light pipes perform the same function as the standard incandescent lamp.

The present invention still further contemplates a type of fixture which optionally has a lens to direct or concentrate the pattern of light from the fixture into the desired horizontal or vertical sectors of emission.

Embodiments of the invention employs limited sector angles and mounting locations to reduce glare. In particular embodiments, light fixtures are configured with a well defined horizontal and vertical light beam spread sector to minimize glare. By innovative construction of the lights, easy service, versatile adjustment, and compliance with the intent of the Navigation Rules can be attained, despite sea conditions or craft planing attitudes.

The present invention uses adjustable fixtures to accommodate curved and sloped surfaces found on boats. In one aspect of the invention, a ball and socket or ball on ball seat adjustable mount of the light source is employed such that the light beam can be aimed relative to the horizon and the heading of the boat. The ball portion of the fixture contains the light source and reflective cavity similar to an eyeball type fixture. In particular embodiments, the light reflector, lamp, and part of the lamp holder composite assembly portion of the fixture are affixed to a ball as part of a ball and socket type fixture much like an eyeball in a socket. This permits the eye portion to be aimed correctly relative to the horizon and the craft heading. The ball and socket are of a construction similar to small flush mounted docking lights, but without a focused forward pointing beam. A ball and ball seat may be used with a back retainer plate holding the ball against the seat.

For exemplary eyeball type fixtures according to embodiments of the present invention, a light shield, which limits the beam spread sectors, is of substantially the same radius of curvature as the ball itself. This provides a benefit because, by virtue of the increased distance from the lamp to the shield, the fixture generates a more well defined cutoff line on the light beam sectors.

Another embodiment is a dual purpose shading mask and lamp holder retaining ring. Further embodiments include a pair of interchangeable shading masks, one being of wider horizontal sector and the other being of narrower sector, each being of dual purpose such that while the correct width mask is in place on the outshining light side of the ball, the other is used to firmly secure the lamp holder in its position in the ball. In alternative embodiments, the construction of the ball is such that it is reversible to function with either side having different beam sector angles of divergence. Another aspect is a reversible dual purpose ball.

Embodiments of the present invention include a non-eyeball type of fixture mounted on a compound angled surface with an adjustable and trimmable mask. The adjustable and trimmable mask projects the desired horizontal fan of light, so that the desired shape and orientation of the mask can easily be calculated or iterated through trial and error.

The masks are configured to be flexible to withstand blunt force impacts with other objects. This flexibility is desirable when the fixture is not totally protected by the hull. The lamp and lamp holder are adjustable within the fixture to obtain the proper sector angles. Also, in another embodiment, the entire fixture is rotatable in the hull. This versatile design is desirable since a three dimensional curvature of the hull often makes it difficult to position the fixture, or lamp, correctly to obtain the proper sector lines relative to the horizon and the craft heading.

Embodiments of the present invention enable an even easier removal of the lamp from either the front or rear of the fixture, but by entirely novel and different means. Another aspect is a novel light source and lamp holder for corrosion resistance and quick service.

In alternative embodiments, the light fixture has a quick insertion and quick removal light source. These bulbs are commonly of the wedge base or bayonet base style. In other embodiments, the lamp holder is made of a resilient material and is retained into the back of the fixture by a partial turn bayonet type connection or by simple resilient friction. In further embodiments, the bulb is removable from the front of the fixture, or alternately from the back of the fixture by removing the lamp holder with lamp from the rear of the fixture. In yet additional embodiments, a simplified base is employed which lends itself to less expensive fabrication costs and less susceptibility to dirt.

The present invention contemplates the extra problems encountered in application to boats with pulpits. A pulpit is a platform extending forward from the bow of the boat. This platform usually has a railing at its perimeter and a slot for an anchor and chain longitudinally along the middle of the platform. The railings above the platform usually lean forward and are a potential source of reflected glare. The anchor and chain below the platform may cause damage to the bow mounted lights or unintentionally mask the forward navigation light from the view of an approaching boat. It is desirable to locate the bow mounted lights below the platform, yet ahead of the anchor, out of harms way.

The light fixture optionally has a reflective back shield to enhance the effectiveness of the light source. In this manner, the light fixture acts as a light shield to minimize the back scatter of light in a direction not intended to be illuminated.

Another aspect of the present invention is the use of fiber optics for an annunciator. In particular, fiber optic light guides from the fixture to the operators station are optionally employed to give the driver continuous status of the working condition of the light source. Such light guides were not used for marine lights most likely because the prior water craft lighting system configurations always caused substantial glare into the operators eyes so that it was obvious that the lights were on or off.

Another aspect of the present invention is the modification of a docking light to serve as a navigation light. In one embodiment, the flush mount docking light is modified to accommodate a small lamp having the luminous characteristics of a navigation lamp.

With reference to the Figures, letters are used to indicate the colors of lights, "R" for red, "G" for green, and "W" for white. The particular colors employed are for illustration purposes only and may be changed as needed to conform to applicable Navigation Rules. The same comment applies to the sector angles of beam spread. The initials "F.O." indicate a fiber optic 87 for conveying light to another location. In FIGS. 5 through 20, navigation lamps are indicated by small empty circles.

Figure 24:
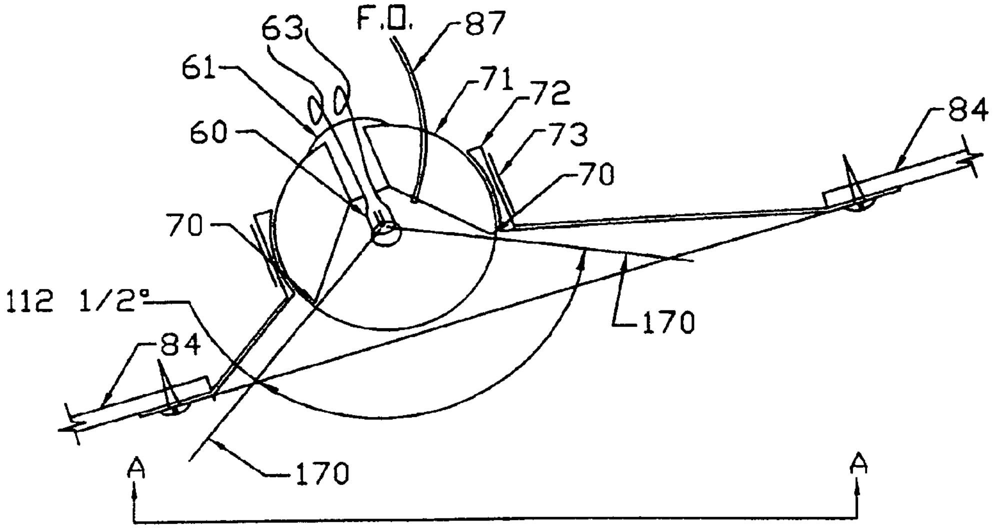
FIG. 24 is a cross sectional top view of an exemplary eyeball type fixture set into a hole in the hull, where the fixture has no lens, has the delimiting mask at the diameter of the sphere thus increases the precision of the vertical and horizontal beam sectors, and uses fiber optics as part of an annunciator of the lamp status.
Figure 25:
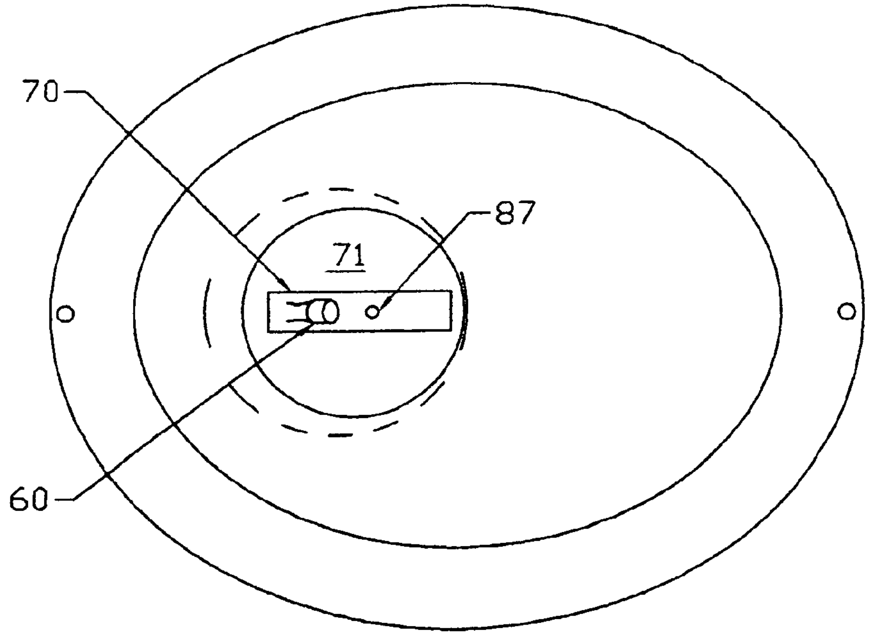
FIG. 25 is a face on view looking along line A-A of the fixture of FIG. 24 as viewed from outside the hull of a boat.

The white forward looking light 50 at the bow of the craft as shown in FIGS. 1, 2, 3, and 4 is suitably mounted in a hole in the hull 84 to protect it from impact but also to facilitate the hull to act cooperatively with the fixture to effectuate glare reduction or shading. At this location, the compound angles of the hull often require a fixture which requires a large angular adjustment in both the vertical and horizontal plane in order to aim the light in the required direction. FIG. 24 is a cross section of an exemplary eyeball type fixture set into a hole in the hull 84. The embodiment of FIG. 24 is not shown with a lens, although optional lenses may be provided for coloration, protection or focusing, or any combination of these functions. The embodiment shown also has the delimiting mask 70 at the diameter of the sphere of the ball 71 thus increasing the precision of the vertical and horizontal beam sectors 170. This embodiment also uses fiber optics 87 as part of a annunciator of the lamp 60 status. In this application, the eyeball type fixture is most suitable in that it allows large angular adjustment, yet still remains protected from damage as it is mounted flush with the hull surface. The ball 71 shown in FIG. 24 and FIG. 25 is adjustable in all directions.

It is noted that the various exemplary eyeball type fixtures described herein may be implemented using a true socket pop-in 72 type feature in contrast to existing eyeball type fixtures that hold the ball 71 in the socket by a curved back plate, such as a hemispherical receiver. Also, the present invention contemplates a ball held into the socket as a pop-in feature or retained by a circular snap ring 73 or a fat O-ring (not shown) or lock screws (not shown). Thus, in contrast to a hemispherical locking plate to retain the ball 71 in the socket, the various exemplary eyeball type fixtures described herein use either of two novel means to secure the ball 71 in position. The present invention also enables simplified components by eliminating the need for a socket type receiver.

Figure 11:
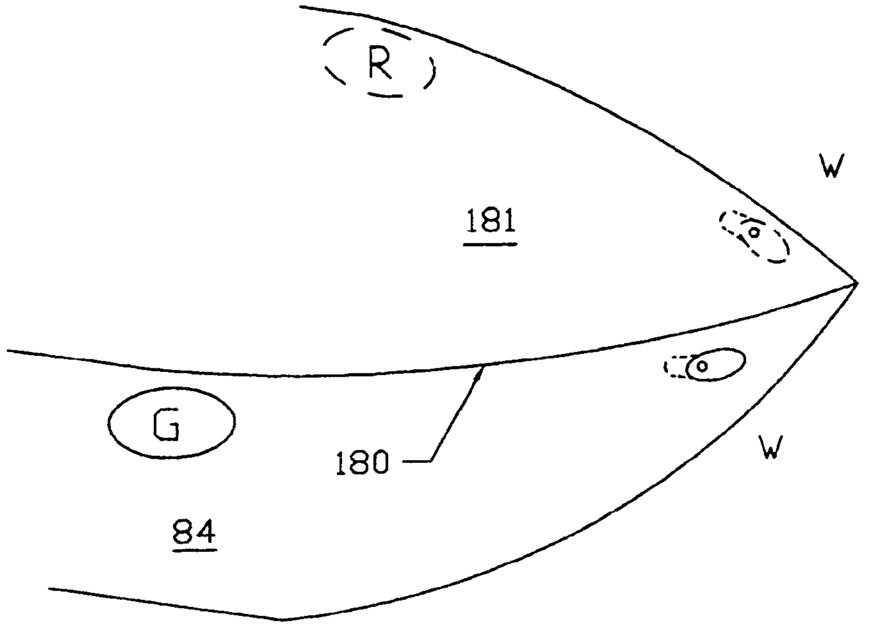
FIG. 11 is a perspective view of the front end of a boat illustrating an exemplary eyeball type fixture, as further shown in FIG. 24 and FIG. 25, for both the red and green side lights and the white masthead lights.

For any given light source and night condition, bloom can be reduced by moving the light source farther away from the line of sight of the driver. Thus, it is advantageous to move the light source to a location below the shear line 180 especially in the front of the boat as shown in FIG. 11, as long as the driver does not receive more glare from light reflections off the surface of the water. It is also advantageous, however, to mount the bow white lights far forward to eliminate water glare especially due to bow wake or splash.

A stern light 53 is mounted in pairs on stern corners of the boat as shown in FIGS. 1, 2, 3 and 4 with the same regard to glare, and protection from physical damage, as the other lights.

An advantageous location of the bow fixtures is below the shear line 180 of the boat because this location maximizes the effectiveness of the hull 84 to act as part of the shading system thus minimizing the glare and bloom in the drivers eyes. Locations at the shear line 180 are subject to more impact and are not as effective in utilizing the hull as a shading device against glare. Locations above the shear line 180 on the deck 181 or on perimeter railings 182 (FIG. 14) are least effective as the hull does not contribute to the shading effect and often there are reflective objects in the light path, such as railings 182 or deck fittings, which cause glare to be reflected into the drivers eyes.

Figure 8:
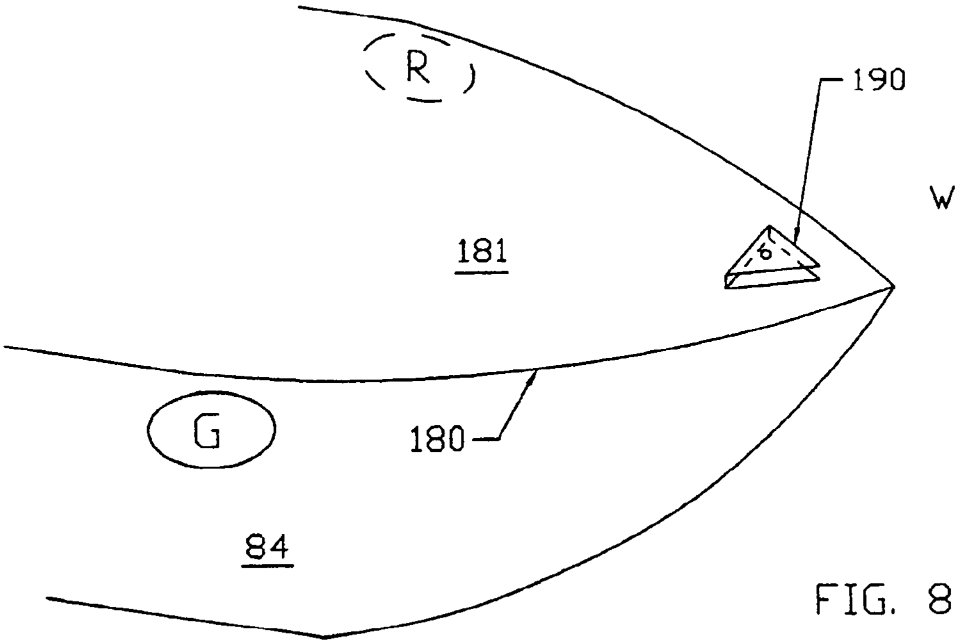
FIG. 8 is a perspective view of the front end of a boat illustrating an exemplary single lamp masthead light on top of the bow.
Figure 9:
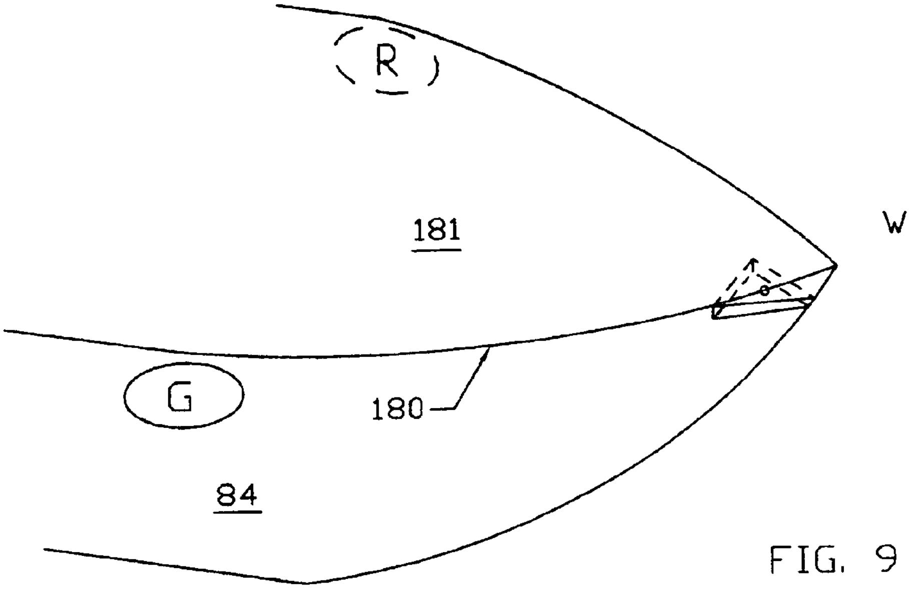
FIG. 9 is a perspective view of the front end of a boat illustrating the single lamp masthead light of FIG. 7.
Figure 10:
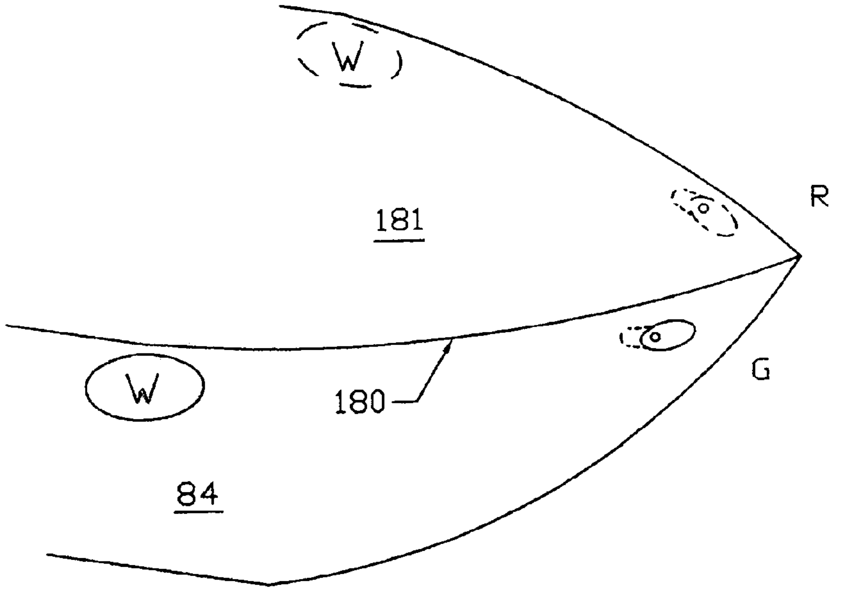
FIG. 10 is a perspective view of the front end of a boat illustrating exemplary locations of the white lights and a fixture for the red and green lights.

The single lamp masthead light 190 mounted on the foredeck 181 embodiment shown in FIG. 8 may cause glare on the foredeck 181 of the boat because it is not as effectively shielded by the boat hull 84, but it may be the easiest to install.

Figure 12:
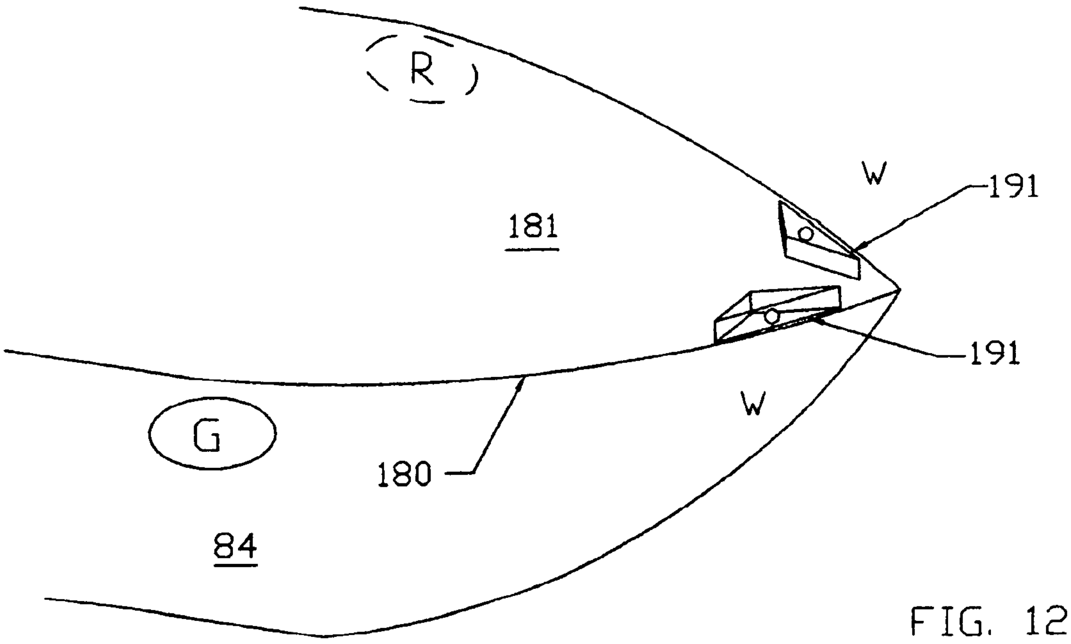
FIG. 12 is a perspective view of the front end of a boat illustrating an exemplary modification of FIG. 8 with split masthead lights which may be desirable for avoiding other hardware such as anchor lines.
Figure 13:
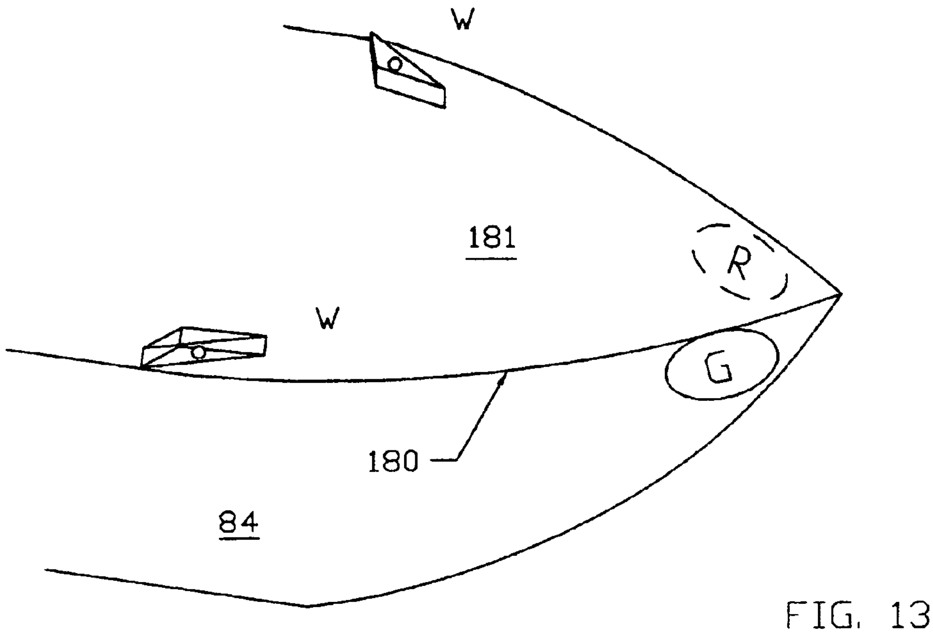
FIG. 13 is a perspective view of the front end of a boat illustrating a reverse installation of the embodiment of FIG. 12.
Figure 14:
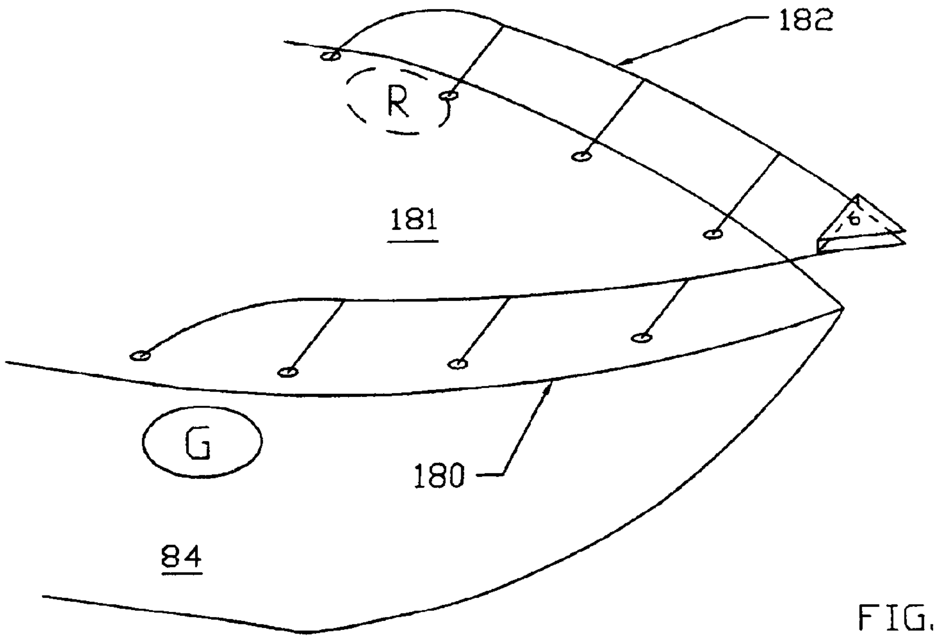
FIG. 14 is a perspective view of the front end of a boat illustrating an exemplary white masthead fixture mounted on top of a bow railing.
Figure 15:
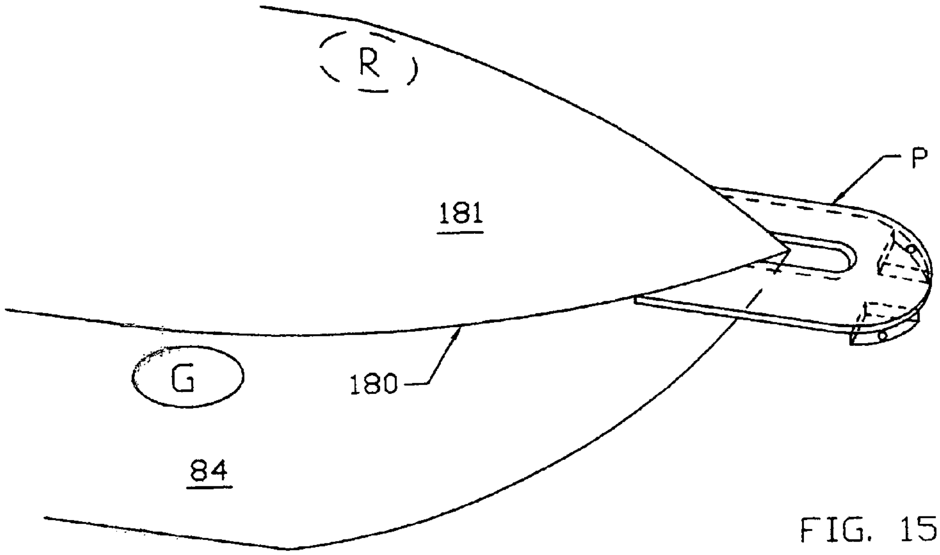
FIG. 15 is a perspective view of the front end of a boat illustrating a pair of white masthead lights mounted on the underside of a pulpit P, where an anchor is often pulled up under the pulpit so that the dual fixtures allow clearance from harm.
Figure 16:
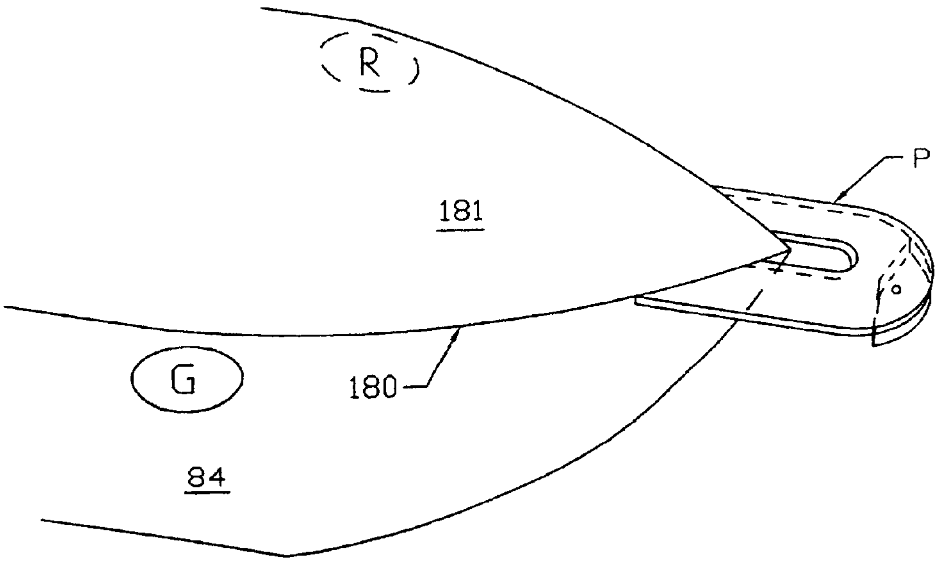
FIG. 16 is a perspective view of the front end of a boat similar to the embodiment of FIG. 15 but illustrating a single lamp masthead light under the pulpit P.

FIG. 12 is a perspective view of the front end of a boat illustrating a minor modification of the single lamp masthead light of FIG. 8 with split masthead lights 191 which may be desirable for avoiding other hardware such as anchor lines (not shown). The masthead lights 191 are mounted on opposite sides of the bow of the watercraft.

Figure 17:
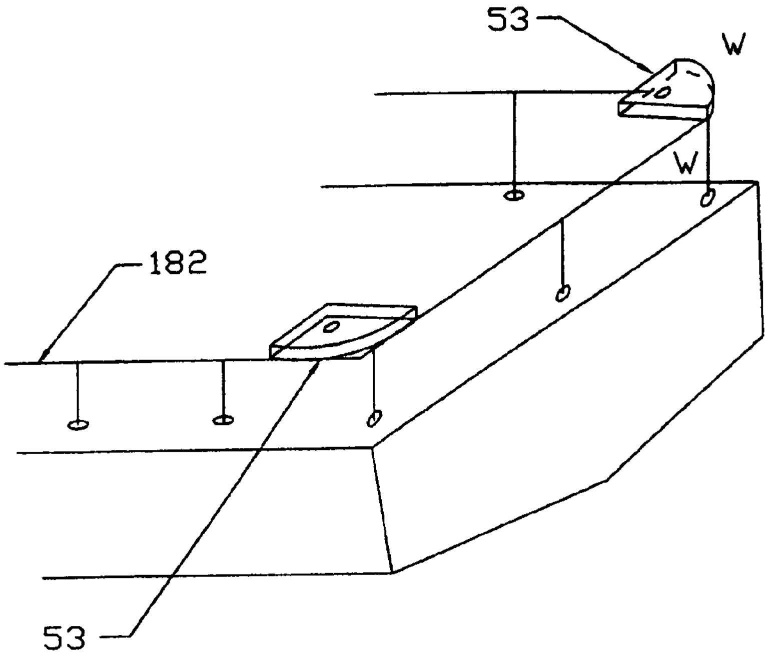
FIG. 17 is a perspective view of the back of a boat illustrating an exemplary embodiment with two stern lights mounted on a railing.
Figure 18:
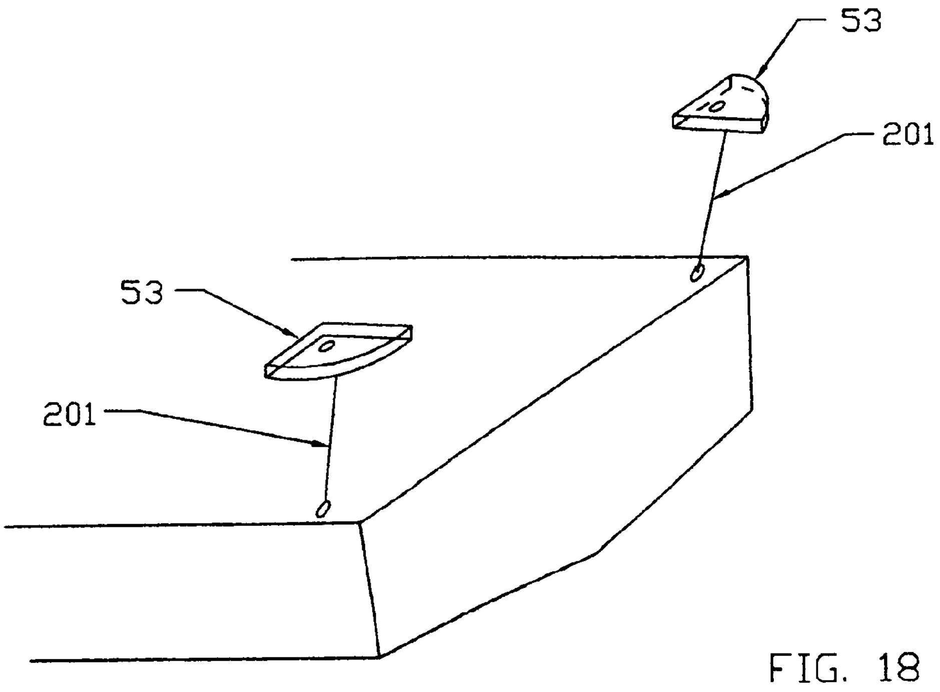
FIG. 18 is a perspective view of the back of a boat illustrating an exemplary embodiment with two stern lights mounted on separate masts and masked to prevent glare on any hardware such as swim platforms or outboard motors or dinghies secured to the back of the boat.

A pair of white stern lights 53 may be mounted on a stern railing 182 as shown in FIG. 17 or other suitable location. Because these stern lights shine backwards over turbulent waters, excessive downward vertical sector illumination may result in water glare from the trailing wake and propeller wash. Water glare from the stern wake and propeller wash can be decreased by mounting the pair of stern lights 53 on masts 201 as shown in FIG. 18. The mast mount, however, is often more vulnerable to damage than a flush mount fixture.

FIGS. 19, 20, 21, 22 and 23 show flush mounts which are inlet into the hull 84 at the rear outer corners of the transom 85 of the craft where they are protected from physical damage. The hull act as both a damage shield and as a light shield. In one embodiment, these fixtures are constructed as shown in FIGS. 26, 27, 28 and 29.

Figure 19:
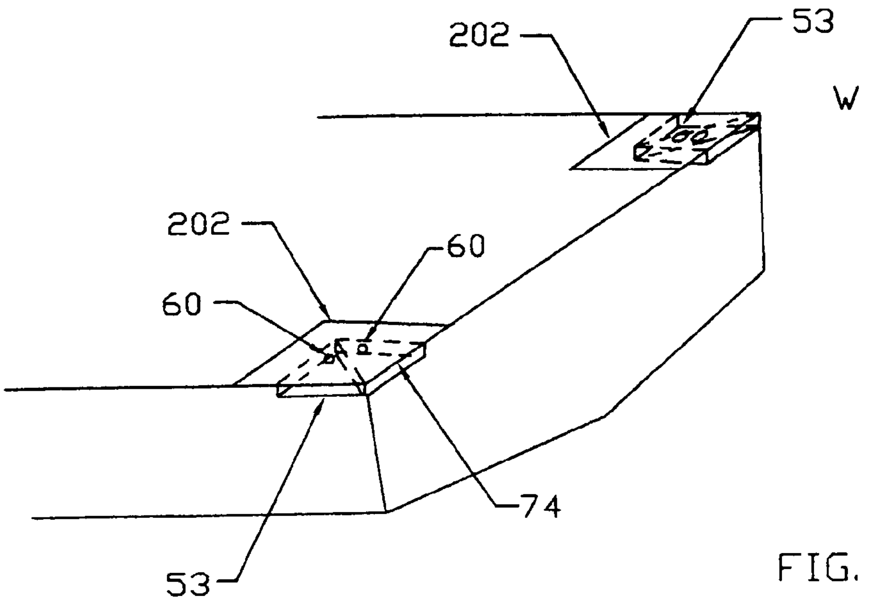
FIG. 19 is a perspective view of the back of a boat illustrating an exemplary embodiment with two stern lights each with two lamps separated by a septum or standoff device.
Figure 32:
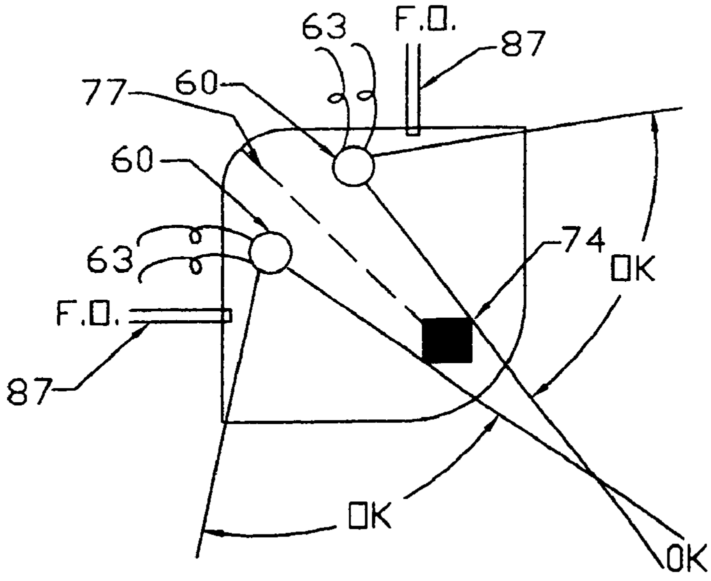
FIG. 32 is a cross sectional top view of the same fixture as shown in FIG. 31 but with a pair of lamps to solve the blind spot area by having overlapping horizontal beams and to provide the added safety benefit of a redundant light source.

FIG. 19 is a perspective view of the back of a boat illustrating two stern lights 53 each with two lamps 60 separated by a septum or standoff device 74. An embodiment of the stern lights 53 are shown in FIG. 32. This embodiment lends itself to current fiberglass hull manufacturing techniques whereby the recess for the lamp 60 is molded directly into the top half of the hull and a cover plate 202 is installed flush with the deck thus preserving the smooth contour of the deck while providing a strong and trip free walking surface.

Figure 21:
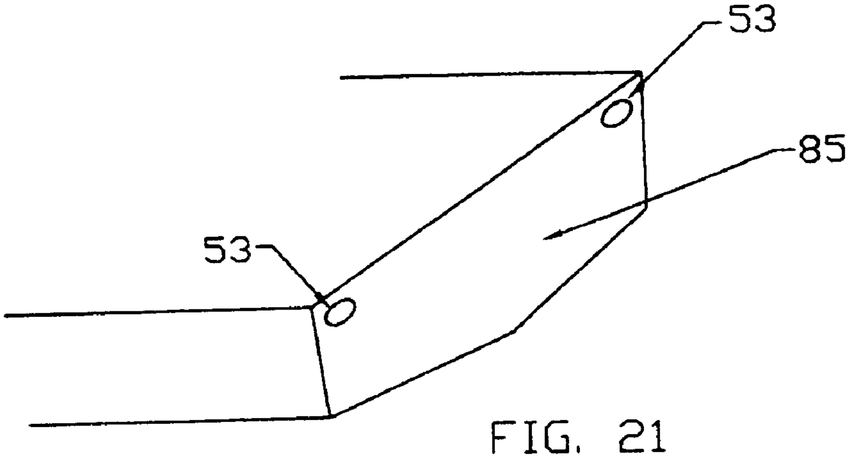
FIG. 21 is a perspective view of the back of a boat illustrating an exemplary embodiment with two stern lights set into a relatively vertical and square transom, which uses two fixtures to provide redundancy and to minimize water glare from the propeller wash or to minimize glare from other stern mounted hardware.

FIG. 21 is a perspective view of the back of a boat illustrating two stern lights 53 set into a relatively vertical and square transom 85. This embodiment illustrates the use of two fixtures to provide redundancy and to minimize water glare from the propeller wash or to minimize glare from other stern mounted hardware.

Figure 23:
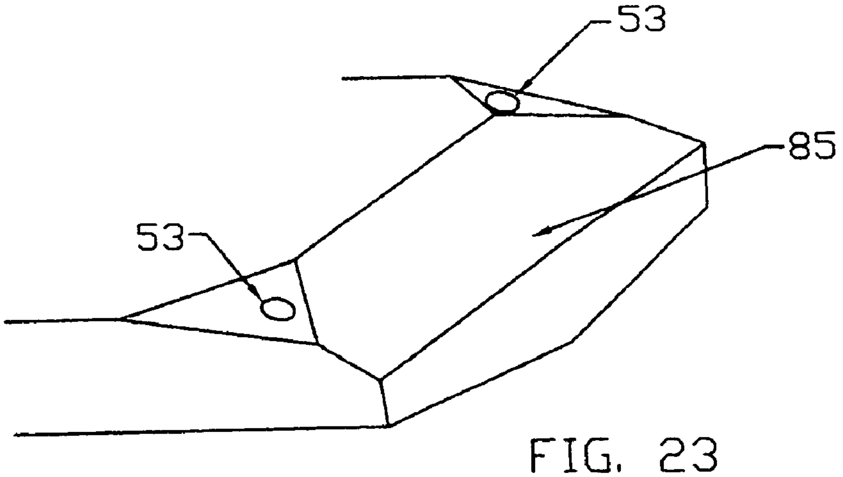
FIG. 23 is a perspective view of the back of a boat illustrating an even more modern sculpting of the stern where the mounting surface is difficult to define whether it is the transom or the side of the hull.

FIG. 23 is a perspective view of the back of a boat illustrating an even more modern sculpting of the transom 85 where the mounting surface is difficult to define whether it is the transom or the side of the hull. This compound angled configuration lends itself to the versatile alignment features of embodiments of the present invention.

Figure 22:
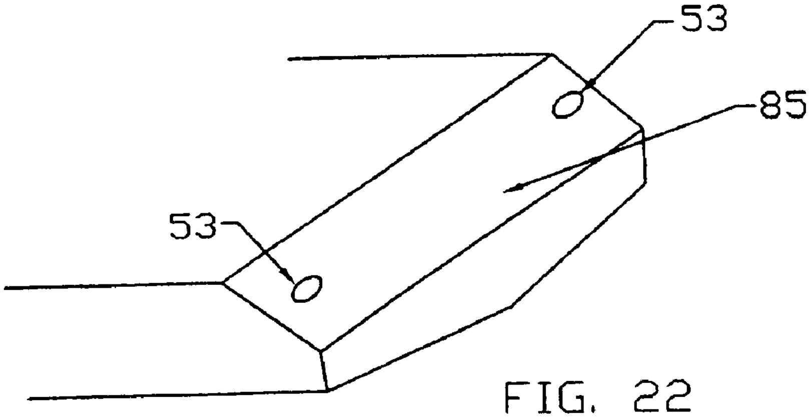
FIG. 22 is a perspective view of the back of a boat illustrating an exemplary embodiment with two stern lights mounted similar to FIG. 21 except on a more modern transom sloped in a streamlined fashion.

Difficult applications such as shown in FIG. 22 or 23 may lend to the versatility of the fixtures shown in FIGS. 24, 25, 38 and 39 with appropriate horizontal and vertical beam sectors.

The colored lights R and G are mounted a considerable distance behind the white bow lights and are flush mounted with the hull. In one embodiment, unlensed red and green colored lamps 60 and unlensed white lamps 60 may be suitable for use as shown in several of the fixture types, including the fixtures shown in FIGS. 24, 25, 26 and 27.

Figure 36A:
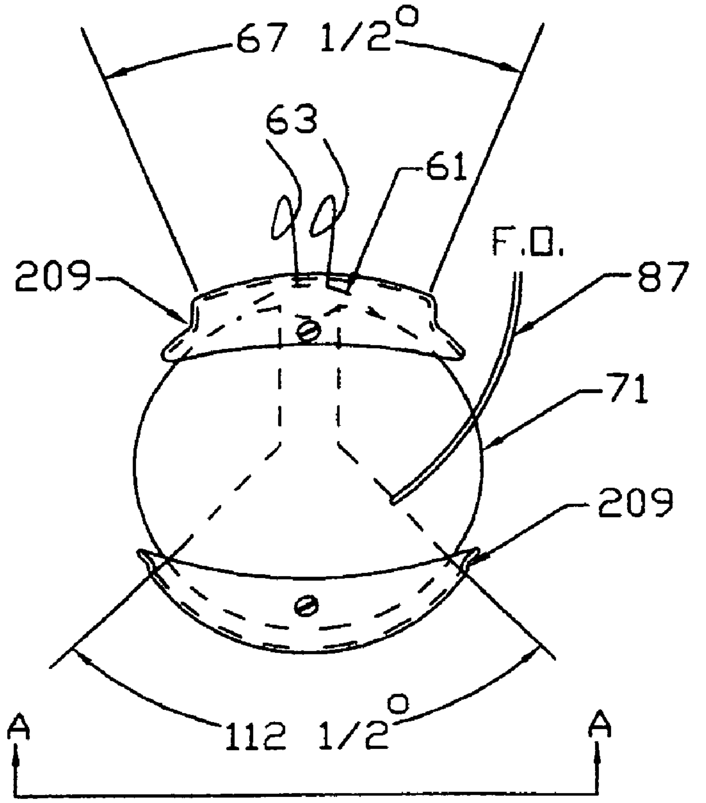
FIG. 36A is a cross sectional top view of the ball portion of an exemplary eyeball type fixture including a pair of dual purpose interchangeable shading masks, one having a wider horizontal sector than the other, whereby the spare mask is used to secure the lamp holder in the ball.

FIG. 24 is a cross section view of an eyeball type fixture set into a hole in the hull 84, where the fixture has no lens, has the delimiting mask 70 at the diameter of the sphere of the ball 71 thus increasing the precision of the vertical and horizontal beam sectors, and uses fiber optics 87 as part of a annunciator of the lamp status. It is noted that lens covers may continue to be required despite advancements in technology such as Light Emitting Diodes (LED) or the like which do not have, nor need, separate lens covers. In various embodiments of the invention, it is recognized that a lens is unnecessary. However, a lens (not shown) may be utilized outside the masking screen 209 as shown in FIG. 36A. The lens can be used for either focusing the light, such as, for example, a Fresnel lens, or is used for protection such as a protecting type non-lensing globe or is clear or otherwise used for coloration as required such as for providing coloration for the red, green, white, or yellow marker lights.

Figure 20:
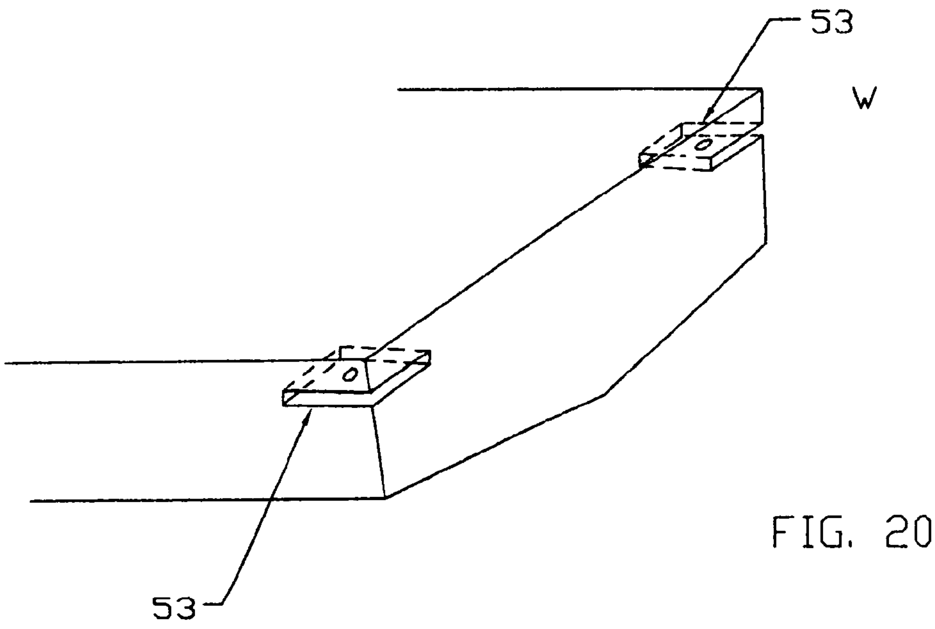
FIG. 20 is a perspective view of the back of a boat illustrating an exemplary embodiment with two stern lights set into the hull corner.
Figure 26:
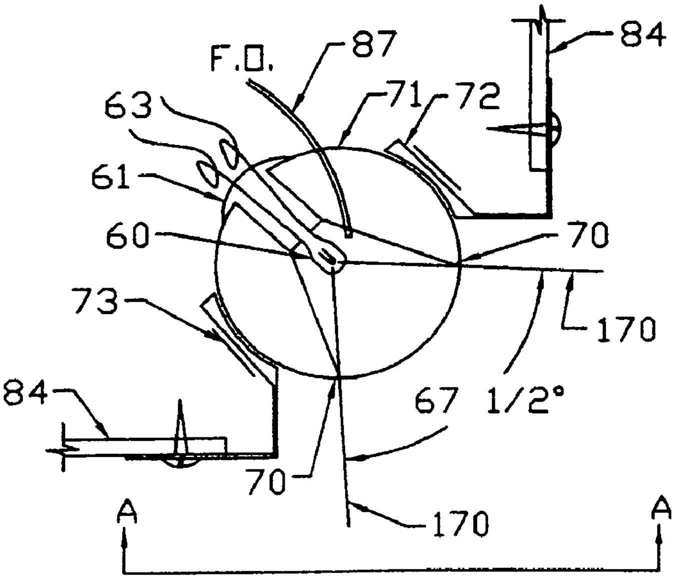
FIG. 26 is a cross sectional top view of an exemplary eyeball type fixture suitable for mounting in the outer corner of the transom.
Figure 27:
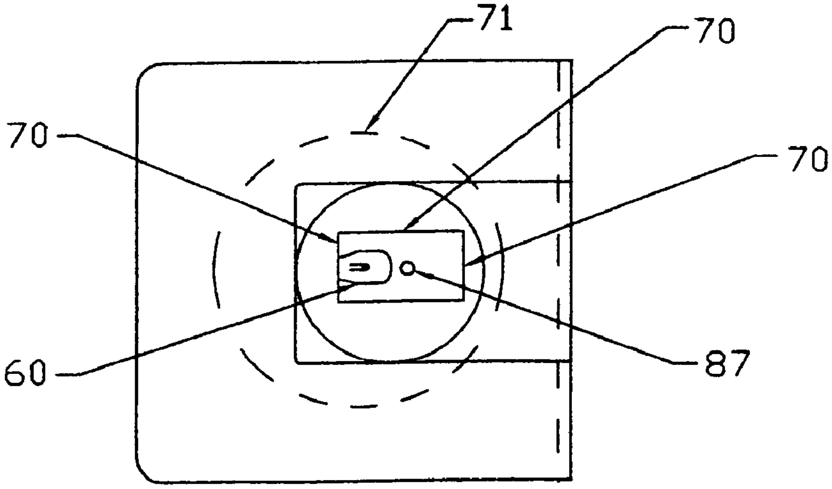
FIG. 27 is a face on view looking along line A-A of the fixture of FIG. 26 and illustrates the limits of the sphere and integral mask.

FIG. 26 shows an eyeball type fixture suitable for mounting in the outer corner of the transom 85 of the hull 84. The angle shown is typical of the stern light half-angle (67.5 degrees) and is subject to change in accordance with the law. This fixture lends itself to stern-mounted applications as shown in FIG. 20.

Figure 28:
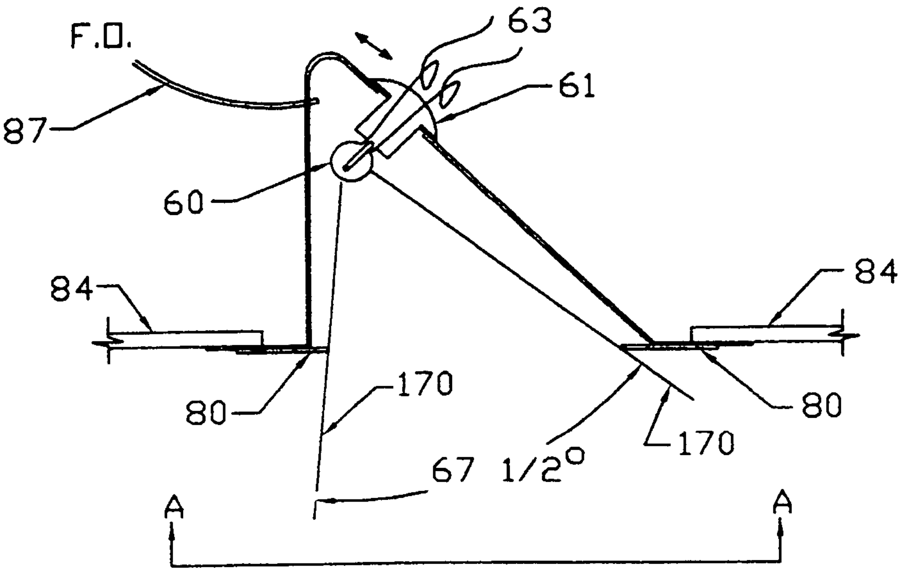
FIG. 28 is a cross sectional top view of an exemplary transom light similar to the fixture of FIG. 26 except that the transom light is suitable for mounting slightly inboard from the corners in a more protected location similar to that shown in FIG. 21.

FIG. 28 shows a transom light similar to the fixture of FIG. 26 except that the transom light is suitable for mounting slightly inboard from the corners in a more protected location similar to that shown in FIG. 21. In this application, there is no eyeball type adjustment, and proper sector angles are attained by trimming and adjusting the mask 80, and by translocating the lamp holder 61.

Figure 29:
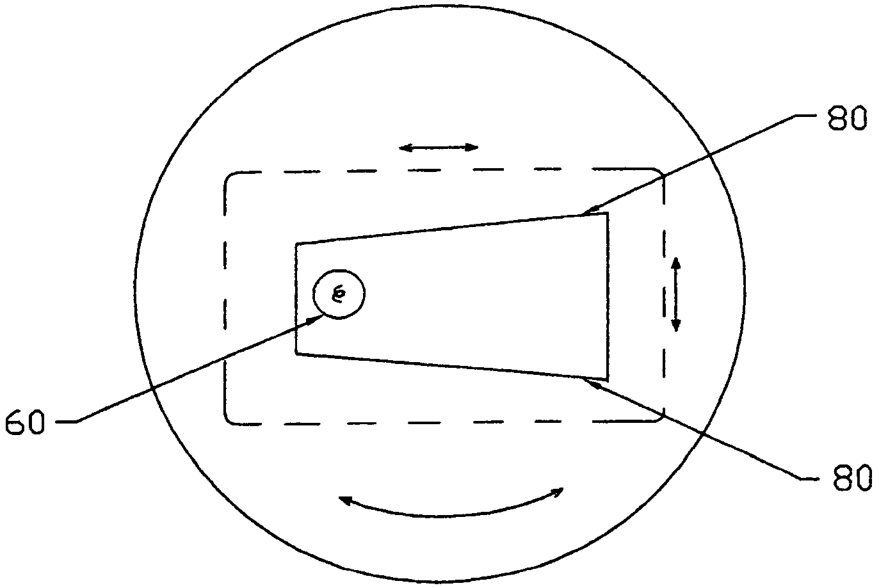
FIG. 29 is a face on view looking along line A-A of the transom light of FIG. 28 as seen from the stern of the boat.

The light fixtures shown in FIGS. 24, 25, 26, and 27 may be comprised of an aluminum or stainless steel or plastic cavity which is wider than it is tall to approximate the required horizontal and vertical sectors of light emission as determined by the delimiting mask 70. Near the back of the cavity, a light source 60 is mounted in a lamp holder 61 such that its irradiance is limited by the cutoff angles of the outer edges of the delimiting mask 70 or the masking skirt 80 as shown in FIGS. 28 and 29.

The socket 72 of the fixtures shown in FIGS. 24, 25, 26, 27, 34 and 35 is slotted lengthwise to allow the ball 71 to pop into the socket 72 and be held in compression by a circular draw band 73.

The light source 60 may be a simple wedge base automotive light bulb such as trade size 906 or 912, or the old style metal base bayonet style bulb (not shown). For the colored light requirement, the bulb is either red or green or other as needed. The cavity walls may be colored the same as the bulb 60 to enhance visibility or to prevent confusion by inserting the wrong color bulb for replacement. The cavity is of a reflective nature to cause the back emitted light to be redirected to the intended direction out the face of the fixture.

The lamp holder 61 is preferably a resilient plastic material with a set of quarter turn bayonet lugs to secure it to the reflector, or fixture, as commonly known in the automotive trade. It has been observed that due to the resiliency of these lamp holders, they will remain in position within the fixture hole by simple resilient friction of a slight interference fit. These lamp holders have two conductors 63 and are designed for use with a wedge base lamp. Older style lamp holders (not shown) which are designed for use with a bayonet base lamp may be used in lieu of the wedge base lamp and holders.

This lamp holder 61 facilitates easy change out of the lamp from inside the hull by simply turning the lamp holder a quarter turn and withdrawing the lamp holder 61 and lamp 60 as a unit to service the lamp. On friction type fits of the lamp holder 61 into the fixture, the lamp holder with the lamp is simply pulled out of the back of the fixture to service the lamp. Service of the lamp 60 from outside the hull 84 is simply a matter of pulling the lamp out of the lamp holder 61.

The light fixture shown in FIGS. 28 and 29 is not of the eyeball type. It is a fixed cavity that has adjustments for limiting the sector angles by rotating or shifting vertically or horizontally the masking skirt 80 which can also be trimmed to limit the beam spread in the prescribed pattern. This invention also contemplates the vertical and horizontal adjustment of the lamp holder 61 to adjust the beam pattern.

Figure 30:
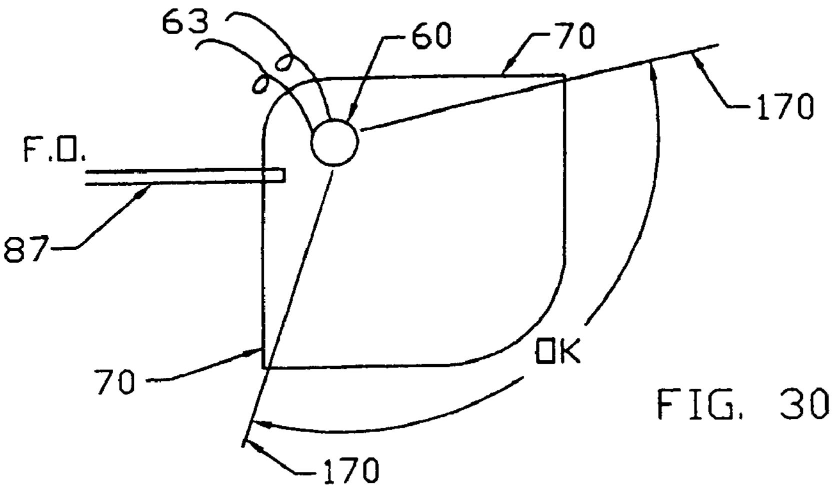
FIG. 30 is a simplified cross sectional top view of an exemplary light fixture with a single lamp and a full, unobstructed horizontal sector.
Figure 31:
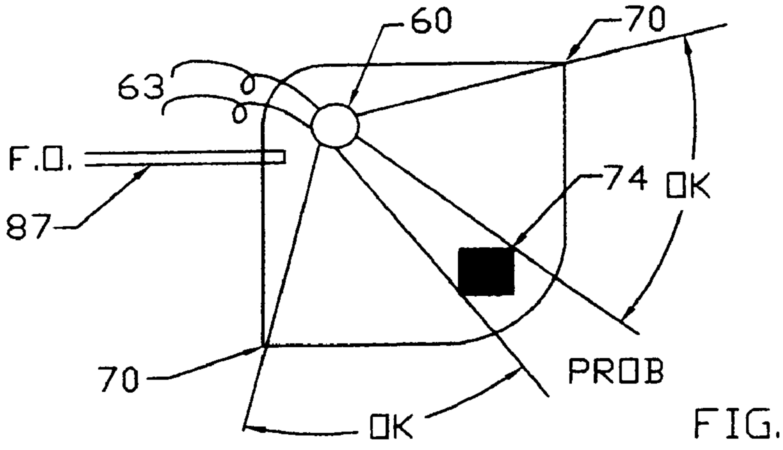
FIG. 31 is a cross sectional top view of an exemplary light fixture similar to that shown in FIG. 30 with a rigid standoff representing a post near the outer periphery as need for crush strength in certain applications.

FIG. 30 shows an exemplary light fixture with a single lamp 60 and a full, unobstructed horizontal sector OK. FIG. 31 shows a fixture similar to that shown in FIG. 30 further including a rigid standoff 74, shown as a black square, representing a post near the outer periphery as needed for crush strength in certain applications such as the stern-mount configuration shown in FIG. 19. It is obvious that a part of the horizontal beam sector is obstructed by the rigid standoff 74, which is unacceptable. The horizontal sector is divided into two sectors OK separated by an obstructed sector PROB.

The concept of one versus two lamps 60 within a fixture is shown in simplified schematics of FIG. 32. A plan view of a light fixture with a single lamp 60 is shown in FIG. 30 depicting the delimiting mask 70 of the cavity. As shown in FIG. 32, the fixture has a rigid standoff 74 which partially interrupts the intended full horizontal beam sector. The dual lamps 60 of FIG. 32 solve the sector problems of FIG. 31 by having overlapping beam sectors OK. It is contemplated that a light blocking septum 77 may be desirable to prevent a distant observer from seeing two light sources.

The eyeball type fixture shown in FIGS. 24, 25, 26, 27, 38 and 39 is constructed as a ball 71 allowed to swivel up or down and left and right then secured in position. The ball 71 portion is comprised of a light reflective cavity, a lamp 60, and a lamp holder 61 all within the diameter of the ball 71. One embodiment utilizes an unlensed lamp 60 positioned in a cavity such that the emitted light pattern is limited by the edges of the delimiting mask 70 to approximate the vertical and horizontal sector limits required of navigation lights.

Figure 34:
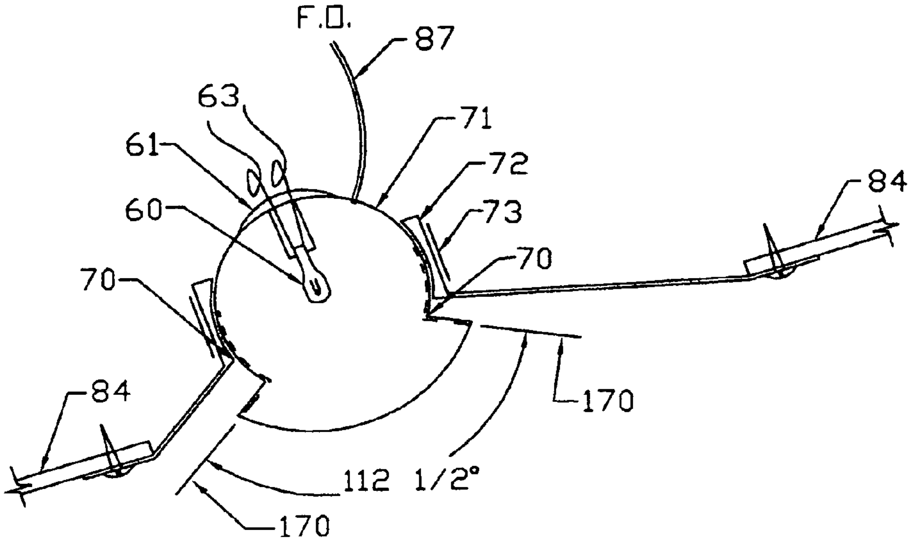
FIG. 34 is a cross sectional top view of an exemplary eyeball type fixture similar to that of FIG. 24 with an extended shade.
Figure 35:
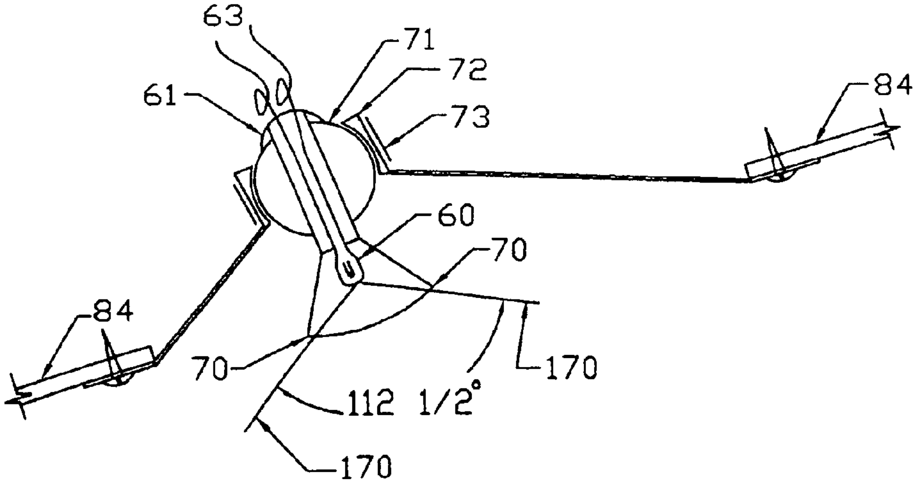
FIG. 35 is a cross sectional top view of an exemplary eyeball type fixture similar to that shown in FIG. 24 with a smaller ball and an extended shading mask.

It is contemplated, as shown in FIGS. 34 and 35, that the outer limits of the delimiting mask 70 could actually fall outside the radius of the main ball 71. The further the delimiting mask 70 is away from the light source 60, the sharper the cutoff line becomes, however, this complicates the construction. Also, the center of the ball then must be placed further inside the hull 84 if it is to be considered flush mounted and thus receive the protective benefit of the hull 84.

A light conducting fiber optic material 87 extends from the light to the operators station to indicate "light-on" status and can be incorporated into any of the numerous embodiments.

Figure 33:
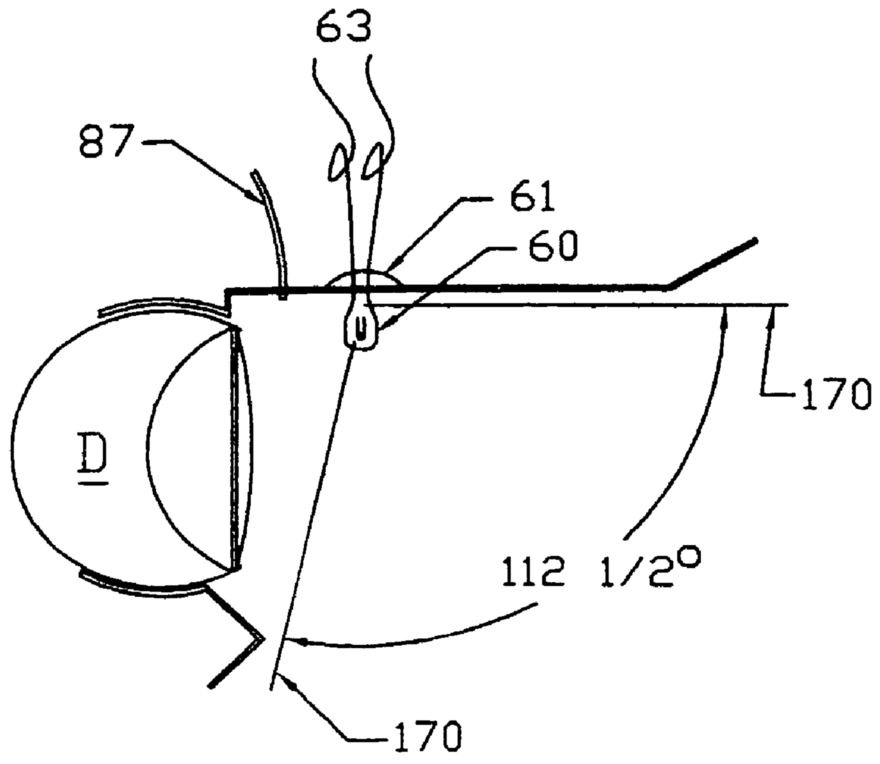
FIG. 33 is a cross sectional top view of a docking light that has been modified to receive a smaller lamp to serve as a navigation light.

FIG. 33 shows a typical docking light fixture with a large and relatively bright docking light D as known in prior art and further modified according to the present invention to include a small lamp 60 to serve as a navigation light and an added fiber optic 87 to an annunciator panel. FIG. 33 shows an embodiment of the invention as an improvement to a docking light by the addition of a lamp 60 and lamp holder 61 and a fiber optic 87 to an annunciator panel. This embodiment allows a docking light fixture to support a navigation light.

FIG. 34 shows an embodiment of the invention similar to FIG. 24 with a reduced sphere size of the ball 71 which may be advantageous in manufacturing or application of the invention. The flared part of the delimiter mask 70 is substantially a rectangular funnel.

FIG. 35 shows an embodiment of the invention similar to FIG. 24 with a still further reduced sphere size of the ball 71 which may be advantageous in manufacturing or application of the invention. The flared part of the delimiter skirt 70 is substantially a rectangular funnel.

Figure 36B:
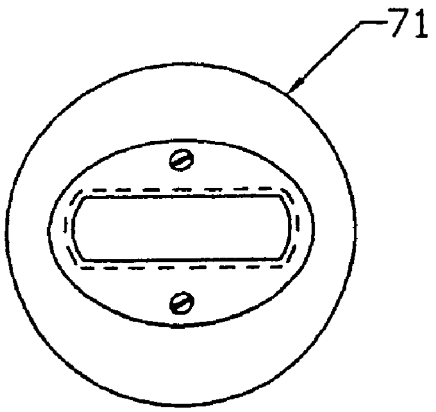
FIG. 36B is a face on view looking along line A-A of the ball portion of FIG. 36A as viewed from outside the hull of a boat.

FIGS. 36A and 36B illustrate another embodiment illustrating primarily the ball 71 portion of a dual purpose fixture, whereby one fixture can be used to emit a wide horizontal sector suitable for bow mount and side light, or the narrower horizontal sector of the stern light. This dual purpose fixture has two interchangeable shading masks 209 such that one can be active on the lighted side of the fixture, while the other is used to secure the lamp holder 61 into the ball 71 by gripping the flange base of the lamp holder 61. The shading masks 209 are typically made of stamped stainless steel which is cupped to fit the curvature of the ball 71 and secured to the ball by screws. The shading masks can be rimmed to secure a lens if desired. The ball 71 or the base has provisions for a fiber optic 87 to an annunciator element.

FIGS. 36A and 36B illustrate a dual purpose light which simplifies manufacturing and stocking problems. Here the solution is to have two shading masks 209 which are interchangeable. While one mask is on the active side of the light, the other is on the dark side of the ball and serving to secure the lamp holder 61 in position against the ball 71. This one has some appeal because the lamp holder 61 is difficult to keep in the ball 71 even though the lamp holder 61 has resiliency for a friction fit. Ideally, the male lugs on the shoulder of the lamp holder 61 engage female bayonet lug receivers on the ball 71 to secure the two together. The best solution is to use the unused mask 209 for another purpose, namely, to hold the lamp holder 61 in place.

Figure 37A:
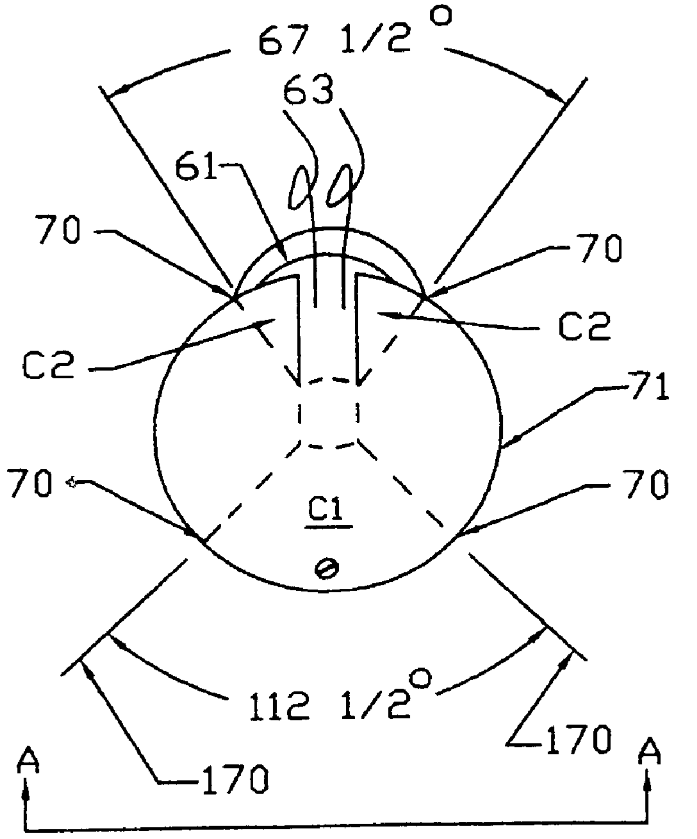
FIG. 37A is a cross sectional top view of an exemplary eyeball type fixture illustrating a reversible, dual purpose ball with the same part having two different cavities of different sector angles, and includes an outset view of a receiver plate.
Figure 37B:
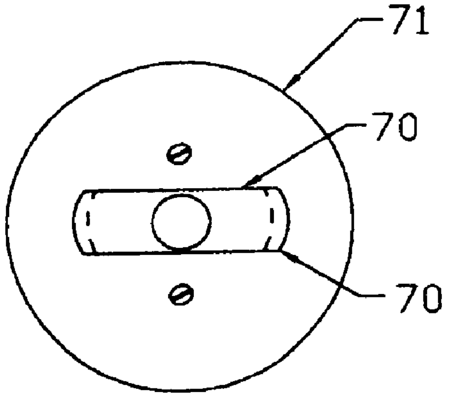
FIG. 37B is a face on view looking along line A-A of the fixture of FIG. 37A as viewed from outside the hull of a boat.

FIGS. 37A and 37B illustrates another embodiment showing primarily the ball 71 portion of the fixture. It shows dual cavities of differing horizontal sector angles. The front half of the ball 71 has a divergent cavity C1 with a horizontal beam spread of 112.5 degrees to satisfy the half angle requirements of the masthead lights and the full angle requirements of the side marker lights. The back half of the ball 71 has a divergent cavity C2 with a horizontal beam spread of 67.5 degrees to satisfy the half angle requirements of the stern lights. With this embodiment, the fixture can be used for multiple use by simply turning the ball 71 around to the other end out, reinserting the lamp holder 61 and securing the optional lens. This embodiment minimizes stocking inventory problems and does not add appreciably to the manufacturing cost. The cavities C1, C2 are actually rotated 90 degrees to each other to increase the strength of the ball, but in this graphical representation, are shown parallel for clarity of the concept. A retaining ring is used to keep the lamp holder 61 in position and to seal the back side of the ball. It is contemplated that the lamp holder 61 male bayonet lugs engage a small receiver plate (not shown), which is attached to the back of the ball 71.

Figure 38:
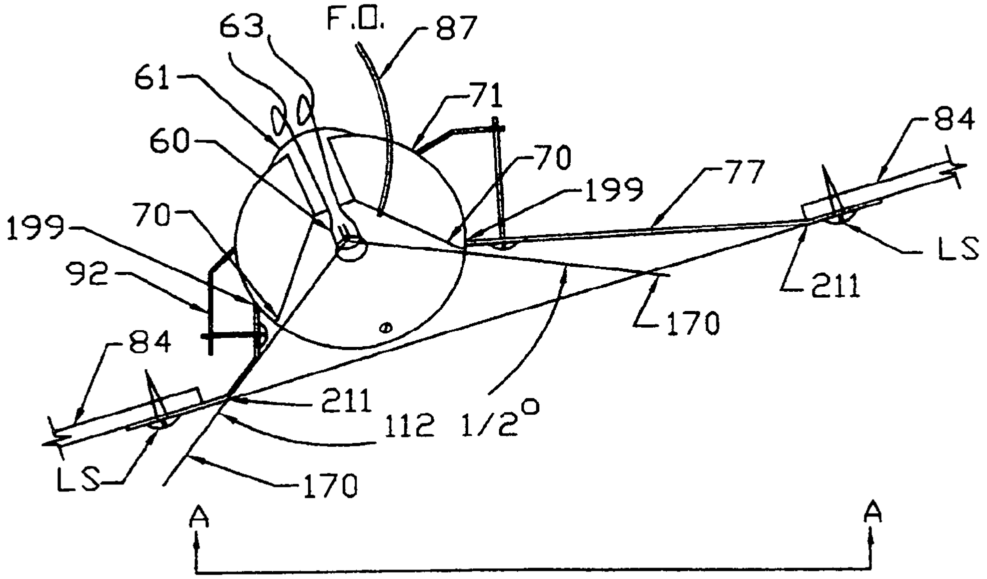
FIG. 38 is a cross sectional top view of an exemplary eyeball type fixture in which the ball rests on a ring formed by a truncated cone and is held in position by a separate ring which can be drawn tight against the ball to prevent rotation.
Figure 39:
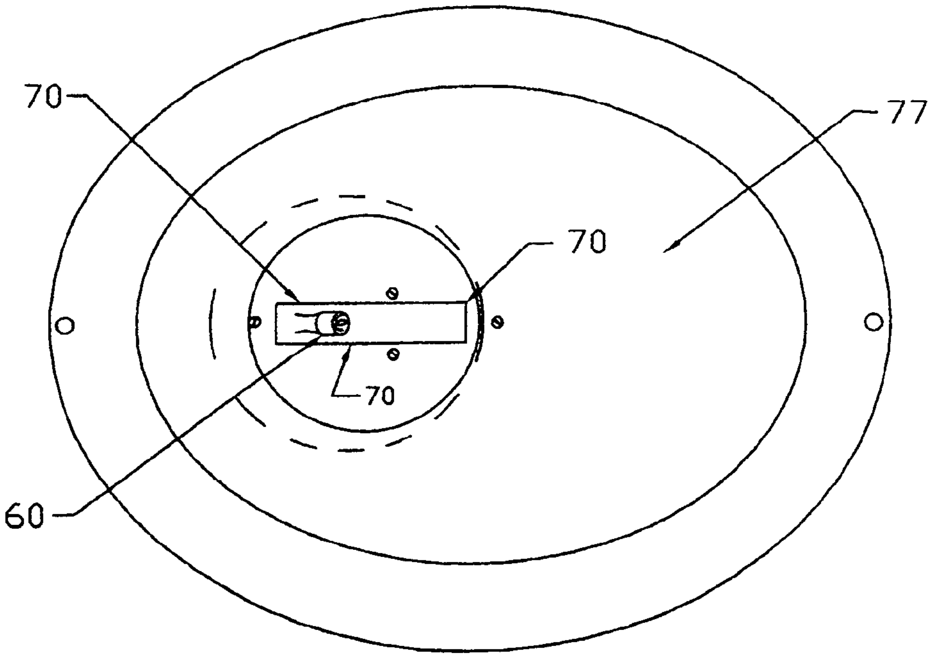
FIG. 39 is a face on view looking along line A-A of the fixture of FIG. 38.

FIGS. 38 and 39 illustrate another alternative embodiment which lends itself to aiming of the light beam from outside of the hull 84. The embodiment shown in these figures does not use a ball and socket mount, rather a ball 71 is held against a hole in a disk in this version. An unlensed light source is used. Also, the delimiter mask 70 is farther away from the lamp 60 as it is mounted on the surface of the ball 71 and not as part of the lamp holder 61 assembly. This feature provides a sharper line of demarcation of the horizontal and vertical sector limits.

FIGS. 38 and 39 shows a ball 71 resting on a ball seat 199. This embodiment is different than the ball and socket of FIGS. 24 and 25, however, it uses many of the same parts including the ball 71 and the lamp and lamp holder 61. This embodiment uses a novel means to support the ball 71 on the ball seat 199. The ball seat 199 is part of a cone or dished fixture base 77 which has a small opening acting as the ball seat 199 and a larger rim 211 where it is attached to the hull 84. A circular retaining ring 92 holds the ball 71 in position against the ball seat 199. The locking screws LS and retaining ring 92 can be rotated 90 degrees to simplify screwdriver access.

As shown in FIG. 38, a dished fixture base is stamped from metal or formed of plastic and the ball 71 is held against it by a retaining ring 92. This is simple to make and simple to adjust. It is simply a ball held securely against a round hole. This design does not fill with dirt that would otherwise make future adjustments difficult.

Another swivel light for boats is similar to that shown in FIG. 39 and is further supplied with two interchangeable stainless steel shading masks similar to the ball of FIG. 36A and a stamped stainless steel female bayonet receiver plate secured to the back of the ball to engage the resilient male bayonet lugs on the lamp holder. The rear receiver plate 209 allows for a generous clearance bore to allow ample cooling ventilation around the lamp 60 for longest bulb life. The difficult part of the tooling process is to generate an internal cavity without resorting to expanding dies. In this design, the large bore is molded into the ball from the back side and then covered over with the back receiver plate 209 for accepting the lamp holder 61.

An alternative embodiment is a dual cavity ball as shown in FIG. 37A, having a narrow sector C2 on one side and wide sector C1 on the other. A problem with this embodiment is that there can be a large gap in the ball 71 which can leak a considerable quantity of water into the boat and be a nuisance.

The ball type fixtures described herein can be made of a stainless steel conic base, a plastic ball, and a stainless steel clamp ring. It is understood, however, these configurations and materials are exemplary only and that other materials may be used as would be appreciated by those of ordinary skill in the art.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention.

The invention claimed is:

1. A docking light system for a watercraft, comprising:

a docking light fixture;

a docking lamp positioned within the docking light fixture; and an accessory lamp mounted to the docking light fixture;

wherein the accessory lamp emits light outwardly from the watercraft and is masked to control the horizontal and vertical beam sectors of emitted light from illuminating the watercraft which would otherwise cause glare to an occupant of the watercraft.

2. The docking light system of claim 1, further comprising a fiber optic, mounted to the docking light fixture, to convey a visual signal to an annunciator panel.

3. The docking light system of claim 1, wherein the accessory lamp operates as a masthead light when mounted at a bow of the watercraft.

4. The docking light system of claim 1, further comprising:

first and second docking light fixtures;

first and second docking lamps positioned within the first and second docking light fixtures, respectively; and first and second accessory lamps mounted to the first and second docking light fixtures;

wherein the first and second accessory lamps collectively operate as a masthead light when the first and second docking light fixtures are mounted to a bow of the watercraft.

5. The docking light system of claim 1, further comprising:

first and second docking light fixtures;

first and second docking lamps positioned within the first and second docking light fixtures, respectively; and first and second accessory lamps mounted to the first and second docking light fixtures;

wherein the first and second accessory lamps collectively are a masthead light.

6. The docking light system of claim 1, wherein the accessory lamp comprises a white accessory light shining forward.

7. The docking light system of claim 1, wherein the accessory lamp comprises a white accessory light shining rearward.

8. The docking light system of claim 1, wherein the docking light fixture is located at the port side of the watercraft and wherein the accessory lamp is red.

9. The docking light system of claim 1, wherein the docking light fixture is located at the starboard side of the watercraft and wherein the accessory lamp is green.

10. A docking light system for a watercraft, comprising:

a docking light fixture;

a docking lamp positioned within the docking light fixture;

an accessory lamp mounted to the docking light fixture; and a fiber optic, mounted to the docking light fixture, to convey a visual signal to an annunciator panel.

11. A docking light system for a watercraft, comprising:

first and second docking light fixtures;

first and second docking lamps positioned within the first and second docking light fixtures, respectively; and first and second accessory lamps mounted to the first and second docking light fixtures;

wherein the first and second accessory lamps collectively are a masthead light.

12. The docking light system of claim 11, wherein the first and second docking light fixtures are mounted at a bow of the watercraft.

13. A watercraft, comprising:

a hull and fittings;

a docking light fixture mounted to a selective one of the hull and the fittings;

a docking lamp positioned within the docking light fixture; and an accessory lamp mounted to the docking light fixture;

wherein the accessory lamp emits light outwardly from the watercraft and is masked to control the horizontal and vertical beam sectors of emitted light from illuminating the watercraft causing glare to an occupant of the watercraft.

* * * * *